(12) United States Patent
Ossig et al.

(10) Patent No.: US 11,727,635 B2
(45) Date of Patent: Aug. 15, 2023

(54) HYBRID PHOTOGRAMMETRY

(71) Applicant: FARO Technologies, Inc., Lake Mary, FL (US)

(72) Inventors: Martin Ossig, Tamm (DE); Johannes Buback, Korntal-Munchingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 17/449,127

(22) Filed: Sep. 28, 2021

(65) Prior Publication Data

US 2022/0130112 A1 Apr. 28, 2022

Related U.S. Application Data

(60) Provisional application No. 63/104,236, filed on Oct. 22, 2020.

(51) Int. Cl.
| | |
|---|---|
| *G06T 17/20* | (2006.01) |
| *G06T 7/586* | (2017.01) |
| *G06T 7/521* | (2017.01) |
| *G06T 7/90* | (2017.01) |
| *G06T 7/529* | (2017.01) |

(52) U.S. Cl.
CPC .............. *G06T 17/20* (2013.01); *G06T 7/521* (2017.01); *G06T 7/529* (2017.01); *G06T 7/586* (2017.01); *G06T 7/90* (2017.01); *G06T 2200/08* (2013.01)

(58) Field of Classification Search
CPC ......... G06T 17/20; G06T 7/521; G06T 7/529; G06T 7/586; G06T 7/90; G06T 2200/08
See application file for complete search history.

(56) References Cited

U.S. PATENT DOCUMENTS

| 9,115,986 B2 | 8/2015 | Heidemann et al. |
| 9,217,637 B2 | 12/2015 | Heidemann et al. |
| 9,858,682 B2 | 1/2018 | Heidemann et al. |
| 10,186,070 B2 * | 1/2019 | Howson .................. G06T 15/06 |

(Continued)

OTHER PUBLICATIONS

Eichhardt, Ivan, et al., "Image-guided ToF depth upsampling: a survey" Machine Vision and Applications, Springer Verlag, DE vol. 28, No. 3, Mar. 13, 2017 (Mar. 13, 2017), pp. 267-282, XP036217195.

(Continued)

*Primary Examiner* — Said Broome
(74) *Attorney, Agent, or Firm* — McCarter & English, LLP; Dave S. Christensen; David K. Kincaid

(57) ABSTRACT

A method for determining three-dimensional (3D) coordinates of an object surface with a 3D measuring device includes forming from the determined 3D coordinates a mesh having a first face, constructing a voxel array aligned to the first face, obtaining a plurality of images from a first camera having a corresponding plurality of poses, obtaining for each voxel in the voxel array a plurality of voxel values obtained from the corresponding plurality of images, determining for each voxel row a quality value determined based at least in part on an average value of a first quantity and a dispersion of the first quantity, the first quantity based at least in part on first voxel values determined as a function of pose, and determining a distance from a point on the first face to the object surface based at least in part on the determined quality values for the voxel rows.

34 Claims, 18 Drawing Sheets

(56) References Cited

U.S. PATENT DOCUMENTS

| | | | |
|---|---|---|---|
| 10,347,014 B2* | 7/2019 | Lyu | G06T 11/006 |
| 10,769,847 B2* | 9/2020 | Sun | G06T 17/00 |
| 2015/0022521 A1* | 1/2015 | Loop | G06T 15/005 |
| | | | 345/424 |
| 2016/0307318 A1* | 10/2016 | Sakai | G06T 7/74 |
| 2021/0010799 A1 | 1/2021 | Becker et al. | |
| 2021/0131788 A1 | 5/2021 | Doring et al. | |
| 2021/0141061 A1 | 5/2021 | Zweigle et al. | |

OTHER PUBLICATIONS

Liu, Hsueh-Ti Derek, et al., "Paparazzi: Surface Editing by way of Multi-View Image Processing", ACM Transactions on Graphics, ACM, NY, US, vol. 37, No. 6, Dec. 4, 2018 (Dec. 4, 2018), pp. 1-11, XP058464766.

Choe, Gyeongmin, et al. "Refining Geometry from Depth Sensors using IR Shading Images" International Journal of Computer Vision, Kluwer Academic Publishers, Norwell, US, vol. 122, No. 1, Sep. 19, 2016 (Sep. 19, 2016), pp. 1-16, XP036160630.

European Search Report for Application No. 21203135.5 dated Mar. 18, 2022; 5 pgs.

* cited by examiner

HYBRID PHOTOGRAMMETRY

REFERENCE TO RELATED APPLICATIONS

This application claims the benefit of U.S. Provisional Application Ser. No. 63/104,236, filed Oct. 22, 2020, the entire disclosure of which is incorporated herein by reference.

FIELD AND BACKGROUND OF THE INVENTION

The subject matter herein relates to measurement of three-dimensional (3D) coordinates using photogrammetry in combination with other three-dimensional (3D) measurement methods.

Photogrammetry is a method in which measurements are made from a plurality of camera images. When combined with scale information, such a plurality of camera images can be used to obtain 3D coordinates of an object surface. Although photogrammetry provides high density 3D coordinates and further often provides color for the captured surfaces, the 3D coordinates obtained from the camera images can tend to drift so that over relatively large volumes, the determined 3D coordinates can be distorted. In addition, in some cases, 3D measurements cannot be made because of surface conditions, such as homogeneous reflectance for example. In contrast, some 3D measuring instruments provide stable and accurate 3D measurements, but these do not provide the resolution or color information provided by photogrammetry cameras.

Accordingly, while existing photogrammetry cameras and 3D measuring instruments are suitable for their intended purposes, what is needed are methods or systems that combine advantages of photogrammetry cameras and 3D measuring instruments to provide dense 3D data.

SUMMARY OF THE INVENTION

In one embodiment, a method includes: determining three-dimensional (3D) coordinates of an object surface with a 3D measuring device; forming from the determined 3D coordinates a mesh having a first face; constructing a voxel array aligned to the first face, the voxel array having a plurality of voxel rows parallel to the first face; obtaining a plurality of images from a first camera, the first camera having a corresponding plurality of poses; obtaining for each voxel in the voxel array a plurality of voxel values obtained from the corresponding plurality of images; determining for each voxel row a quality value, wherein the quality value is determined based at least in part on an average value of a first quantity and a dispersion of the first quantity, the first quantity based at least in part on first voxel values determined as a function of pose; determining a distance from a point on the first face to the object surface based at least in part on the determined quality values for the voxel rows; and storing the determined distance.

In another embodiment, a system includes: a three-dimensional (3D) measuring device operable to determine 3D coordinates of an object surface; a first camera operable to capture a plurality of images from a corresponding plurality of poses; and a processor system operable to: form from the determined 3D coordinates a mesh having a first face, construct a voxel array aligned to the first face, the voxel array having a plurality of voxel rows parallel to the first face, obtain for each voxel in the voxel array a plurality of voxel values obtained from the corresponding plurality of images, determine for each voxel row a quality value, wherein the quality value is determined based at least in part on an average value of a first quantity and a dispersion of the first quantity, the first quantity based at least in part on first voxel values determined as a function of pose, and determine a distance from a point on the first face to the object surface based at least in part on the determined quality values for the voxel rows.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
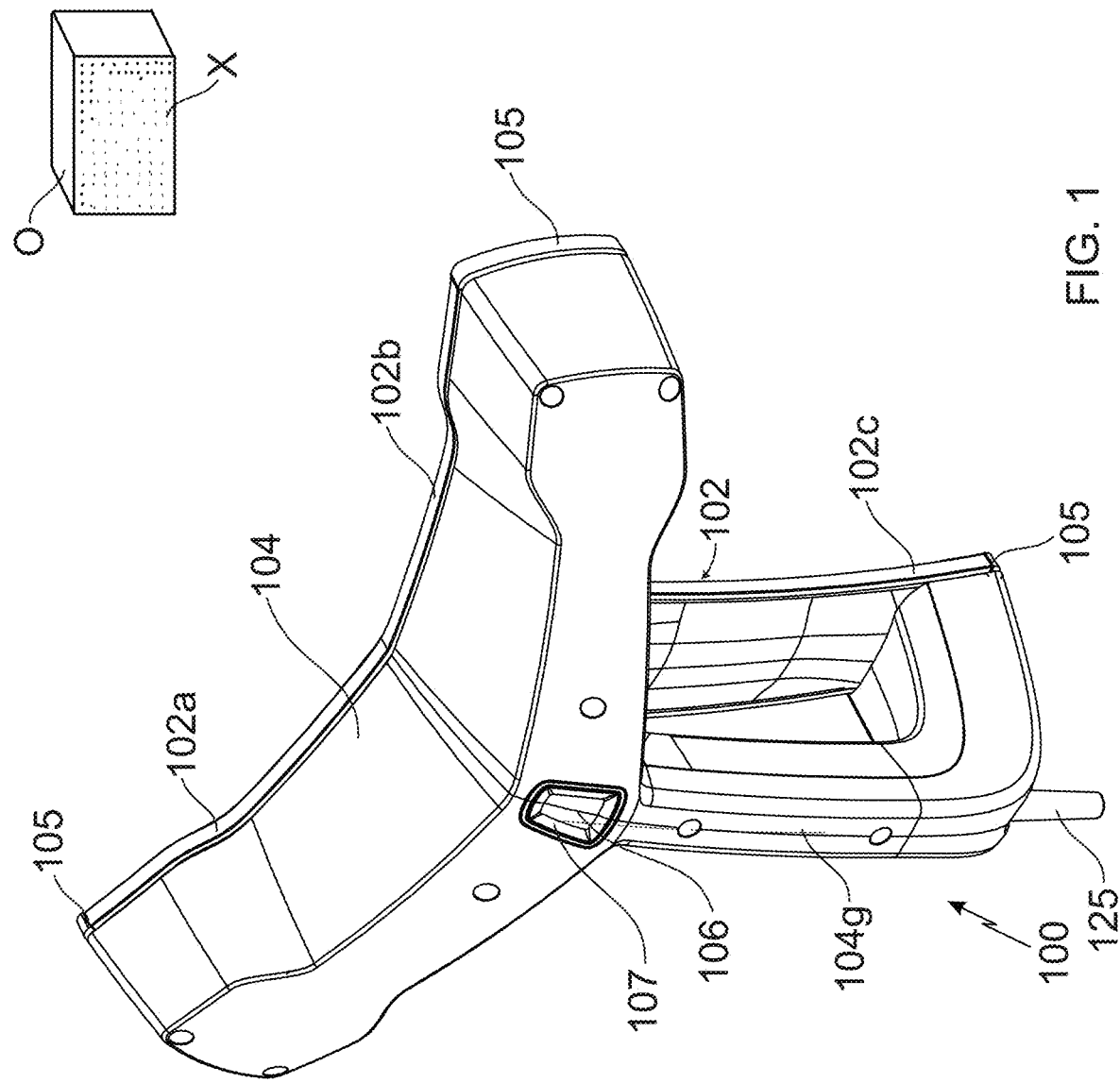
FIG. 1 shows a rear perspective view of a hand-held scanner and an object in the environment.

The following description is exemplary in nature and not intended to limit the present disclosure, its application or uses. Throughout the drawings, corresponding reference numerals indicate like or corresponding parts and features.

Embodiments of the present disclosure provide methods for combining 3D measurements with photogrammetry to simultaneously improve density and accuracy of determined 3D coordinates. Other embodiments of the present disclosure disclose single instruments, or multiple instruments used cooperatively, capable of simultaneously improving density and accuracy of determined 3D coordinates.

Many types of 3D measuring devices may be used to obtain distance to an object surface and 3D coordinates of points on an object surface. Methods commonly used to determine distance to an object surface include (1) time-of-flight (TOF) measurement and (2) triangulation measurement. Examples of TOF devices include trackers, scanners, and total stations. Such TOF devices may use incremental distance meters, absolute distance meters, or both. Incremental distance meters, such as interferometers, return to a reference position if the beam of light is broken from the distance meter to a retroreflector target. In contrast, absolute distance meters (ADMs) can determine distance to an object or target following a beam break. Commonly used ADMs include those that measure distance based on phase modulation or pulse modulation of projected light. In all devices that measure distance based on TOF methods, the measured distance depends on the speed of light through air.

Examples of triangulation devices include area scanners, line scanners, and stereo cameras. Triangulation devices typically rely on one or more baseline distances between perspective centers of cameras and/or projectors. An area scanner may, for example, include a projector and a camera separated by a baseline distance. The projector projects a pattern onto an object. A correspondence between a pattern element projected by a projector and captured by a camera enables 3D coordinates for an object surface point to be determined. Another type of triangulation device includes two cameras separated by a baseline distance (i.e., a stereo camera). By identifying a common object point in the images captured by the two cameras, triangulation methods can be used to determine a distance to the common object point. Triangulation may also be obtained using a single camera moved to several different poses. The term photogrammetry is often used to refer to this type of single camera measurement. In most cases, such single cameras capture images of known/predetermined reference lengths to obtain calibrated lengths in a resulting 3D image. When used in combination with the 3D measuring instrument, the distances measured by the 3D measuring instrument may provide the desired reference lengths.

Figure 2:
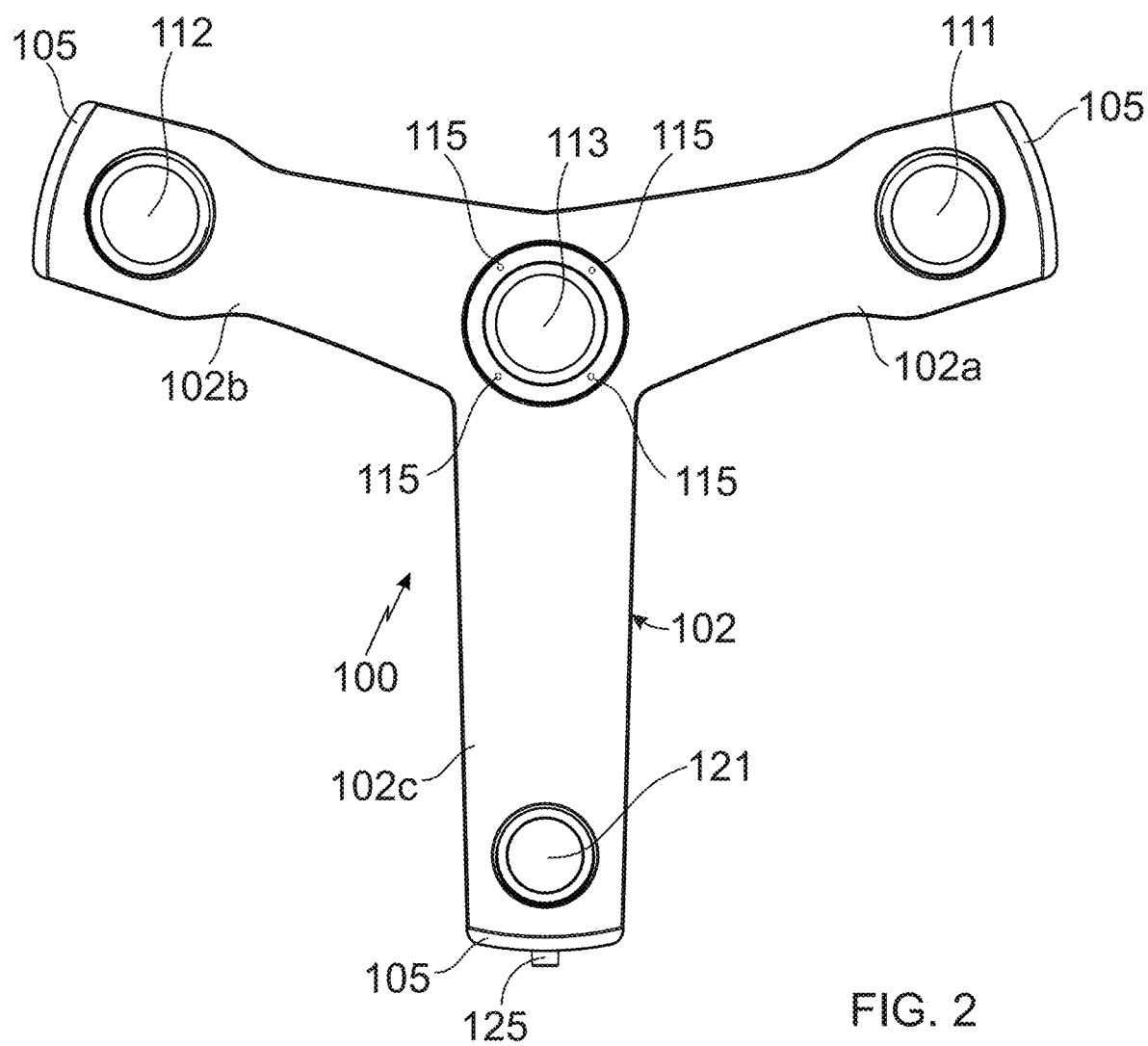
FIG. 2 shows a front view of the hand-held scanner.

FIGS. 1-7 illustrate a 3D measuring device that combines a triangulation type scanner with a camera, which may be an additional camera such as a color camera. FIGS. 1 and 2 show a handheld 3D measuring device 100. FIG. 1 shows a rear perspective view of the measuring device 100 being used to measure an object O, and FIG. 2 shows a front view. The 3D measuring device 100 includes a carrying structure 102 having three arms 102a, 102b, 102c. In an embodiment, the carrying structure 102 is configured from fiber-reinforced synthetic material, such as a carbon-fiber-reinforced synthetic material (CFC). FIG. 1 shows a housing 104 connected to the carrying structure 102 to form a floating connection that reduces vibration transmitted from the housing 104 to the carrying structure 102. The housing 104 forms a handle 104g and defines an interior space of 3D measuring device 100. Protective elements 105 may be attached to the housing 104 or to the carrying structure 102. A control knob 106, arranged on the housing 104, can be used for stopping or starting a scan. In an embodiment, one or more status lamps 107 located around the control knob 106 show the status of the 3D measuring device 100 by emitting different colors.

FIG. 2 shows a first camera 111 separated from a second camera 112 by a defined distance. The carrying structure 102 includes apertures through which the cameras 111, 112 can acquire images. In an embodiment, the first camera 111 and the second camera 112 are monochrome cameras provided with bandpass filters that remove unwanted wavelengths. In an embodiment, the wavelength range passed by the bandpass filter is a relatively narrow range in the infrared (IR) part of the spectrum. In an embodiment, the camera 113 is a color camera that captures two-dimensional (2D) color images of the scene, including images of the object O. In other embodiments, the camera 113 is a monochrome camera. To distinguish the camera 113 from the cameras 111, 112, the camera 113 is herein referred to as the texture camera, where texture refers to any property of the images. For example, aspects of color provide one type of texture, while brightness of image pixels provides another example of a texture property. The camera 113 may in general be any type of camera, either color or monochrome. The texture camera may also be one of the cameras used to determine 3D coordinates. In other words, the cameras 111 or 112 could be considered to be texture cameras if they measured a relevant property used in the way described herein below. The texture camera 113 could in addition be supplemented by one or more additional texture cameras. So, for example, in addition to the cameras 111, 112, there could be two texture cameras 113A, 113B in some embodiments.

Figure 3:
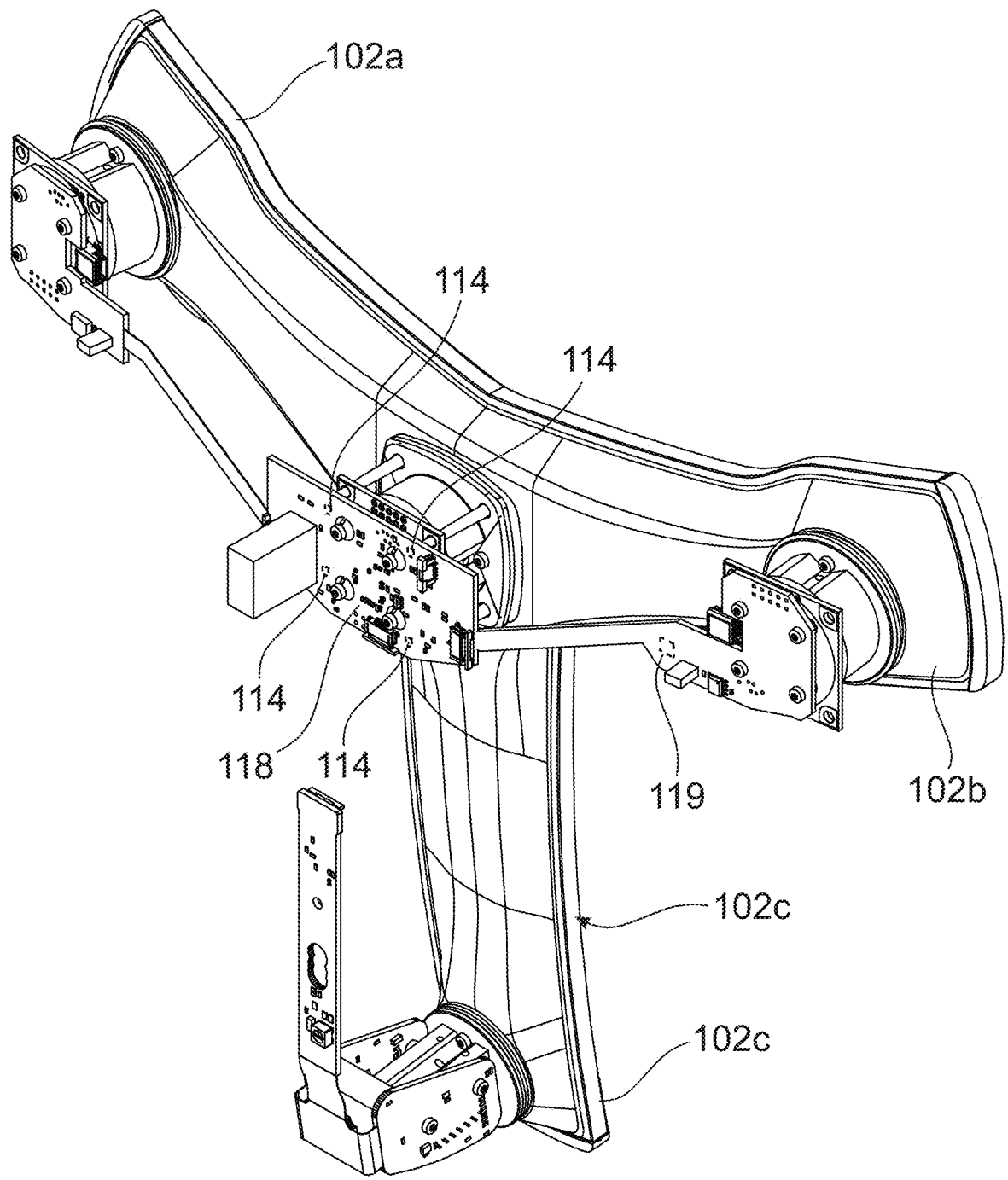
FIG. 3 shows a rear perspective view of the hand-held scanner with a housing removed.

FIG. 3 is a rear perspective view of the 3D measuring device 100 with the housing 104 removed. In an embodiment, a light emitting diode (LED) 114 sends light through radiating elements 115 (FIG. 1), which may be lenses or light guides, for example. Such emitted light may be provided in the event of unfavorable background lighting conditions. In an embodiment, the LEDs 114 are located on a control unit circuit board 228. In an embodiment, an inclinometer 119, which is usually equivalent to an acceleration sensor, measures inclination. Alternatively, the element 119 may be an inertial measurement unit (IU) having a gyroscope as well as an inclinometer.

In an embodiment, the 3D measuring device 100 includes a projector 121 attached to the lower arm 102c, as shown in FIGS. 1-3. The carrying structure 102 includes an aperture through which the projector 121 projects a pattern of light. In an embodiment, the projector 121, the first camera 111, and the second camera 112 are arranged in a triangular pattern. In an embodiment, the cameras 111, 112 and the projector 121 form an equilateral triangle arranged so that the centers of FOVs intersect at a common point some distance from the measuring device 100. This arrangement allows for an increased or maximum amount of overlap to be obtained.

FIGS. 1-3 illustrate an embodiment in which the cameras 111, 112, 113, the projector 121, the control knob 106, the status lamps 107, the LEDs 114, and the inclinometer 119 are connected to and in communication with the control unit 118, which is arranged inside the housing 104. The control unit 118 can be part of a control and evaluation device which is integrated in the housing. The communication interface connects to an external control and evaluation device 122 (FIG. 4) by a cable or wireless connection.

Figure 4:
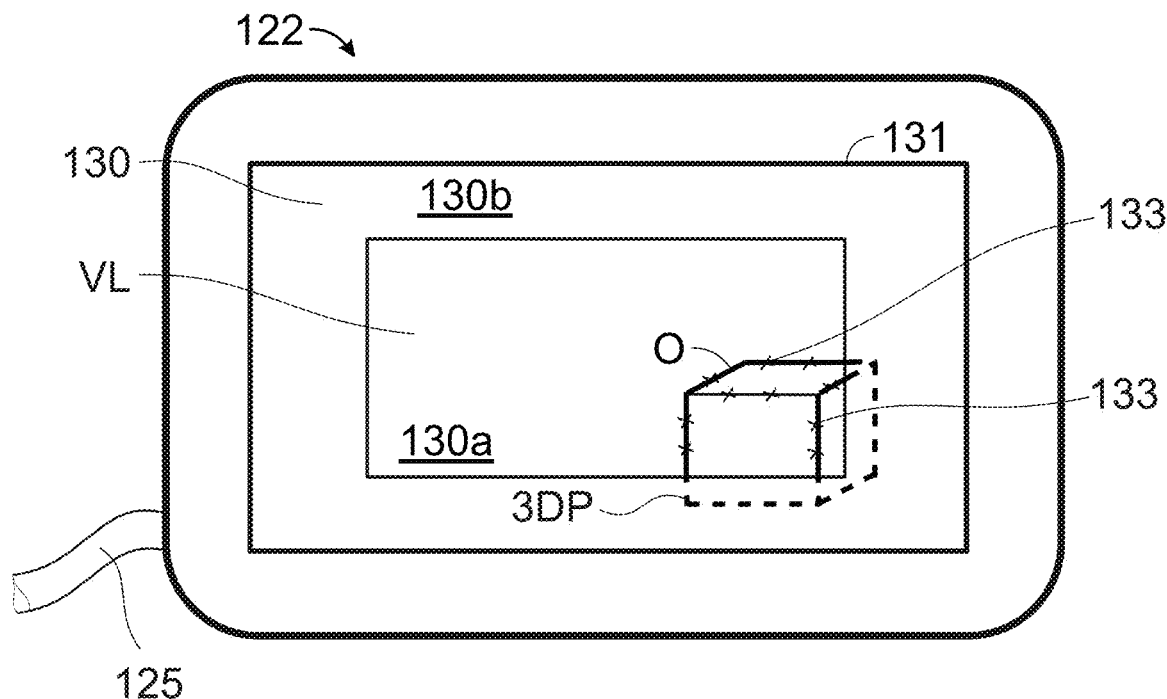
FIG. 4 shows a front view representative of a control and evaluation device.
Figure 5:
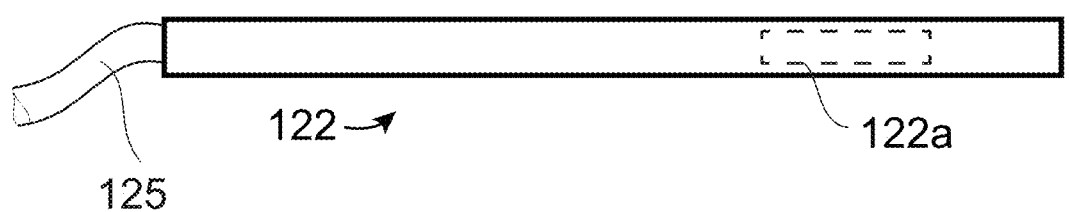
FIG. 5 shows a side view representative of the control and evaluation device.

FIGS. 4, 5 show a top view and a side view, respectively, of the external control and evaluation device 122, which connects to the 3D measurement device 100 via a cable 125. The control and evaluation device 122 includes one or more processors 122a having memory. The processors 122a operate and control the 3D measuring device 100 and further evaluate and store the measured data. The control and evaluation device 122 may be a portable computer, a tablet, a smartphone, or an external or distal computer, such as a computer in the web. The control and evaluation device 122 may be configured in software for controlling the 3D measuring device 100 and for evaluating the measured data. It may be embodied in hardware separate from the control and evaluation device, or it can be integrated into the 3D measuring device 100. The control and evaluation device 122 may be a system of distributed components wherein at least one component is integrated into the 3D measuring device 100 and one component is external. The processor(s) 122a for performing said methods may be included in the 3D measuring device 100, an external computer, or both.

In FIG. 1, the projector 121 projects onto the object O a pattern X. In an embodiment, the projector pattern is produced by an element such as a diffractive optical element (DOE), a microelectromechanical (MEMS) mirror array, or a slide transparency within the projector 121. In an embodiment, a single beam of light within the projector 121 is transformed into a collection of projected light rays. The pattern X may be a coded pattern or an uncoded pattern. In an embodiment using an uncoded pattern, a correspondence between the projected pattern elements from the projector 121 and the pattern elements in the images on the photosensitive arrays of the cameras 111, 112 is determined using simultaneous epipolar constraints, as further explained herein below in reference to FIG. 8.

In an embodiment, the uncoded pattern X (FIG. 1) may be a point or spot pattern comprising a regular arrangement of points in a grid. Such projected spots do not have a structure/shape that would allow them to be distinguished from other projected spots. In an embodiment, a rectangular grid of one hundred points on a side produces a total of 100 times 100 spots (points), or 10,000 points total, onto an area covering approximately 0.5 m by 0.5 m. In an embodiment, the pattern X (FIG. 1) is a monochromatic pattern produced by a DOE 124 in the projector 121.

Images captured simultaneously by the cameras 111, 112 are referred to as "frames." The recording process can include a single frame (shot) or a sequence of frames (video). Such a shot or video may be triggered by the control knob 106. The data furnished by the 3D measuring device 100 is processed in the control and evaluation device 122, which generates 3D scans from the image frames. The resulting 3D scans are joined (registered) in a common coordinate system. In an embodiment, a plurality of images of natural or artificial targets captured by the texture camera 113 are processed by the processor 122a to register the plurality of images in a common frame of reference. The plurality of 3D scans from 3D measuring device 100 may be progressively registered based at least in part on the images captured by the texture camera 113.

In an embodiment, the control and evaluation device 122 is provided with the display 130 to allow the user to view the 3D scans as the measurement proceeds. FIGS. 4, 5 illustrate an embodiment in which the display 130 has a subdivided image or subdivided screen. In an embodiment, the display 130 is divided into a first display part 130a and a second display part 130b. In an embodiment, the first display part 130a is a (rectangular) central part of the display 130, and the second display part 130b is a peripheral area around the first display part 130a. In another embodiment, the two display parts are columns.

In an embodiment, the first display part 130a includes a video live image VL such as that obtained from the texture camera 113, for example. In an embodiment, the second display part 130b includes an image of the latest 3D scan (or a plurality of registered 3D scans) displayed as a view of at least part of a 3D point cloud 3DP. The size of the first display part 130a may be variable, and the second display part 130b is arranged in the area between the first display part 130a and the border 131 of the display 130. As video live image VL changes, such as when the user moves the device 100, the image of the three-dimensional point cloud 3DP may change correspondingly to reflect the change in position and orientation of the device 100. By splitting the display 130 into the parts 130a, 130b, a user can see where additional scanning may be required to increase scan density to a desired level.

Figure 6:
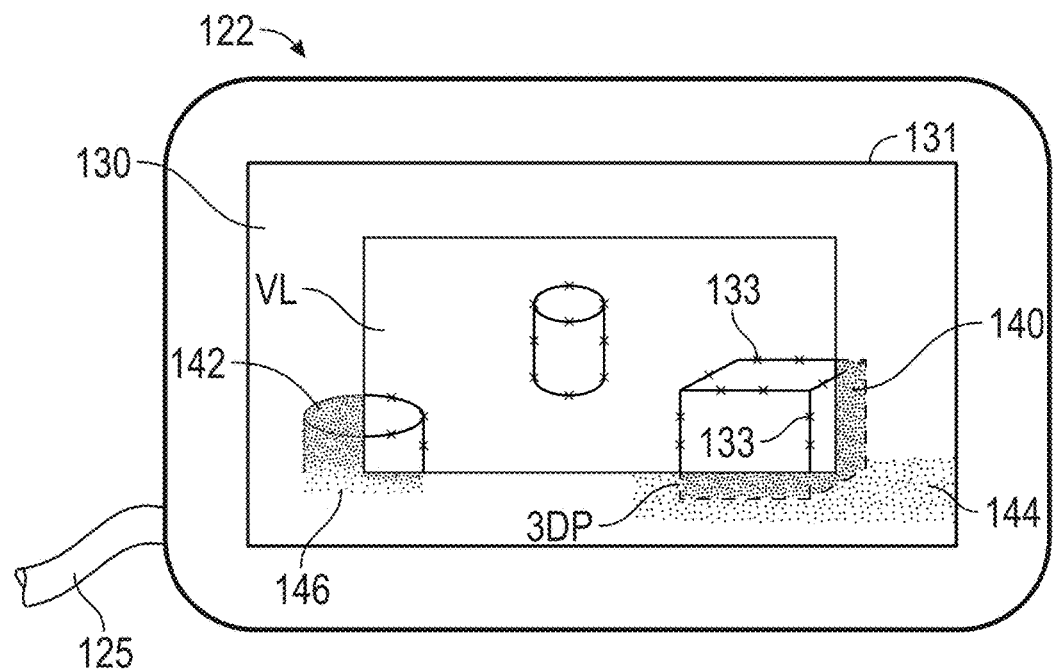
FIG. 6 shows the live video and point-cloud regions of a display of the control and evaluation device.
Figure 7:
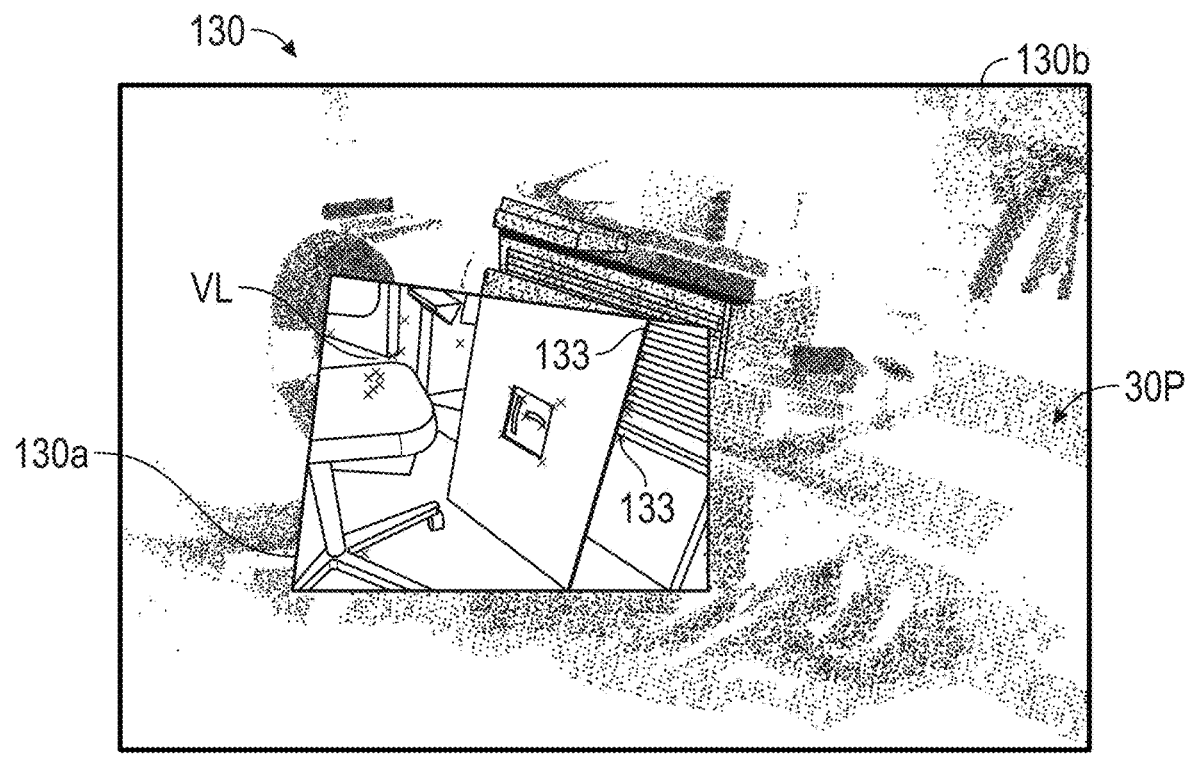
FIG. 7 shows an exemplary computer-generated image of a scanned region.

FIG. 6 illustrates a case in which the determined point clouds in the areas 140, 142 have a relatively high density of determined 3D coordinates compared to the areas 144, 146. The user may judge, based on the displayed image, whether the current density of determined 3D points is acceptable. For example, area 144 may be a tabletop for which a relatively low density of points is acceptable, while the area 146 may require additional scanning to fully characterize the scanned object. FIG. 7 shows an exemplary computer-generated image of a region scanned by the 3D measurement device 100. The portion of the display 30P shows at least a portion of a point cloud collected thus far by a measurement of the 3D measuring device 100.

In an embodiment, flags or marks 133 (FIGS. 4, 6, 7) are inserted in the first display part 130a to indicate features recognized by the control and evaluation device 122 as common to images obtained the texture camera 113 from a multiplicity of poses. Such features may include points, corners, edges, textures, or more complex elements such as those recognized through image processing methods such as scale-invariant feature transform (SIFT) or speeded-up robust features (SURF). The marks 133 may be a symbol, such as a small "x" or "+", for example.

Figure 8:
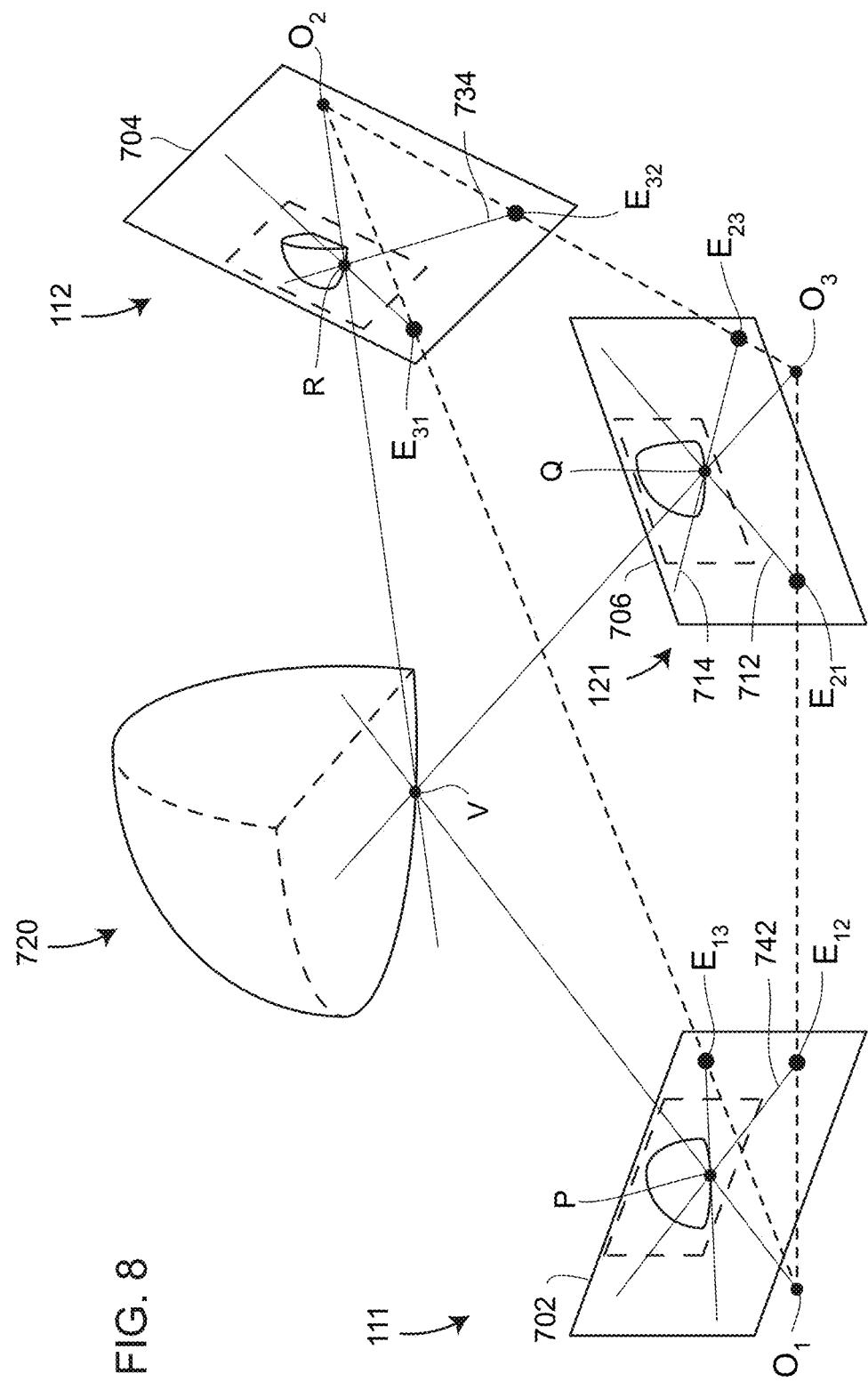
FIG. 8 illustrates use of epipolar geometry to determine 3D coordinates of objects.

In an exemplary embodiment, the projector 121, the camera 111, and the camera 112 are not collinear but instead are arranged in a triangular shape, for example, as illustrated in FIG. 2. This triangular shape allows epipolar geometry to be used to determine the coordinates of the spots projected onto the object O even if each of the projected spots is identical in appearance, that is, having the same size and shape. FIG. 8 illustrates schematically that the camera 111, the camera 112, and the projector 121 have epipolar planes 702, 704, 706, respectively. The epipolar planes 702, 704 correspond to image planes of the photosensitive arrays of the cameras 111, 112 but with the image planes moved to mathematically equivalent positions opposite the perspective centers $O_1$, $O_2$. The epipolar plane 706 corresponds to the projection plane of the projector but with the projection plane moved to a mathematical equivalent position opposite the perspective center $O_3$. Each pair of devices selected from among the set consisting of the camera 111, the camera 112, and the projector 121 has a pair of epipoles. The epipoles are points at which lines drawn between perspective centers intersect the epipolar planes. For example, the pair of epipoles for the cameras 111, 112 are $E_{13}$ and $E_{31}$, respectively. The pair of epipoles for the camera 111 and the projector 121 are $E_{12}$ and $E_{21}$, respectively. The pair of epipoles for the camera 112 and the projector 121 are $E_{32}$ and $E_{23}$, respectively. A line drawn from an epipole through a point on an epipolar plane is referred to as an epipolar line. Hence a line drawn from the epipole $E_{21}$ through a point Q on the epipolar plane 706 of the projector 12 is the epipolar line 712. In an embodiment, the projector 121 projects light from the perspective center $O_3$ through the point Q on the epipolar plane 706 onto an object 720 at a point V. A ray drawn from the point V to the first-camera perspective center $O_1$ passes through epipolar plane 702 at the point P. FIG. 8 shows that the points $O_1$, $O_3$, Q, V, P, $E_{12}$, and $E_{21}$ lie on a common plane. Consequently, for the observed point P on an epipolar line 742 of the epipolar plane 702, the corresponding point Q on the projector epipolar plane 706 is on the corresponding epipolar line 712. In like manner, for an observed point R on the epipolar line 734 of the epipolar plane 704 of the second camera 112, the point Q lies on the corresponding epipolar line 714 of the projector epipolar plane 706.

For the case in which the relative positions and orientations of a single projector and a single camera are accurately known and in which the identity of an element projected by the projector is recognized by the camera, then it is possible in principle to determine the 3D coordinates of the projected spot. However, for the case in which multiple identical spots are projected in a regular grid, a triangulation scanner having a single camera and a single projector cannot in general draw correspondence among individual projected and imaged spots. Consequently, a system having a single camera and a single projector cannot determine the 3D coordinates of the collection of identical projected spots arrayed in a grid. By adding a second camera as in FIG. 8, these projected 3D coordinates can be determined. In effect, the combination of two cameras and one projector, each having a geometry known relative to the others, provides additional mathematical constraints that permit 3D coordinates of a point V to be determined even if the spot projected at V cannot be recognized based on the images of the cameras 111, 112.

Figure 9A:
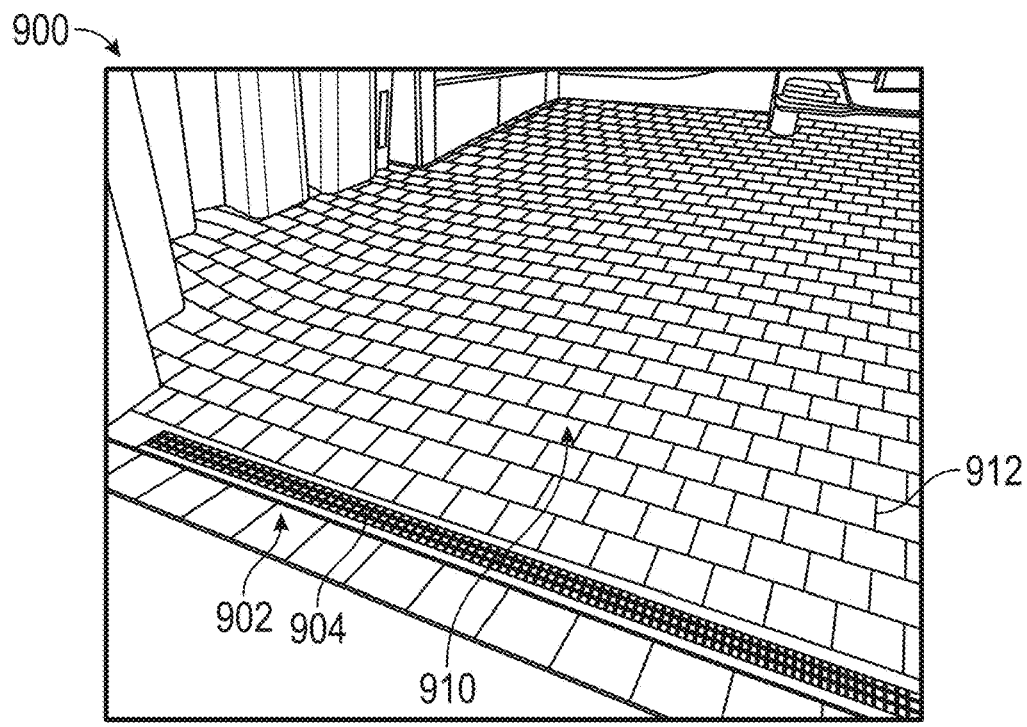
FIGS. 9A, 9B are photographic and scanned images of a driveway according to an embodiment.
Figure 9B:
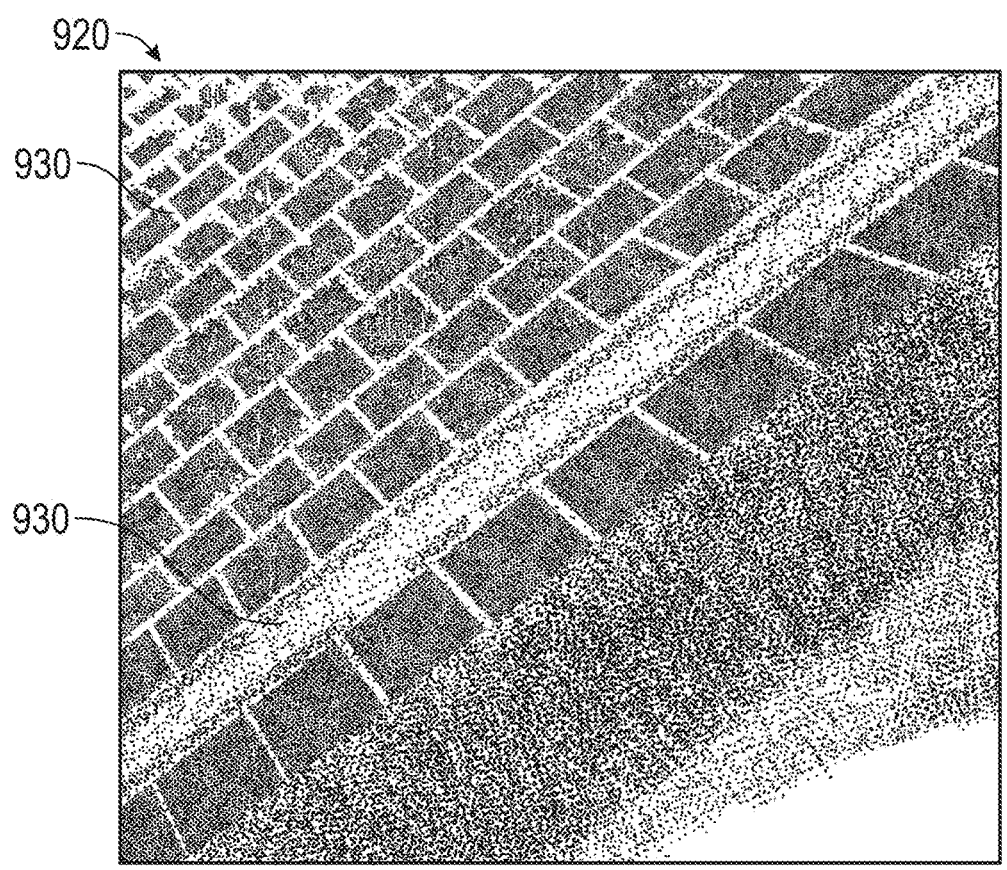

FIG. 9A is an image 900 of a driveway that includes a drainage grate 902 and a collection of bricks 910. The drainage grate 902 has drainage holes 904, and the bricks 910 are assembled with mortar 912. FIG. 9B is an image 920 of 3D scan points obtained by a 3D measuring device such as the 3D scanner 100 and, in addition, of missing scan points 930 indicated by the notable white or gray spots. The missing scan points 930 result when a relatively low level of light is reflected from a location within the image 920. For example, a relatively low level of light may be reflected from the drainage holes 904 or from some regions of mortar 912. Some embodiments a technical effect includes in supplying 3D coordinates to replace the missing scan points 930 with dense, high quality 3D points. In some embodiments a technical effect is to provide additional high-density 3D points are provided even when no points are missing from the normal scan procedure. In still further embodiments a technical effect is to provide additional characteristics of the measured object are represented, for example, colors of the object surface displayed in conjunction with the dense 3D points.

Figure 10B:
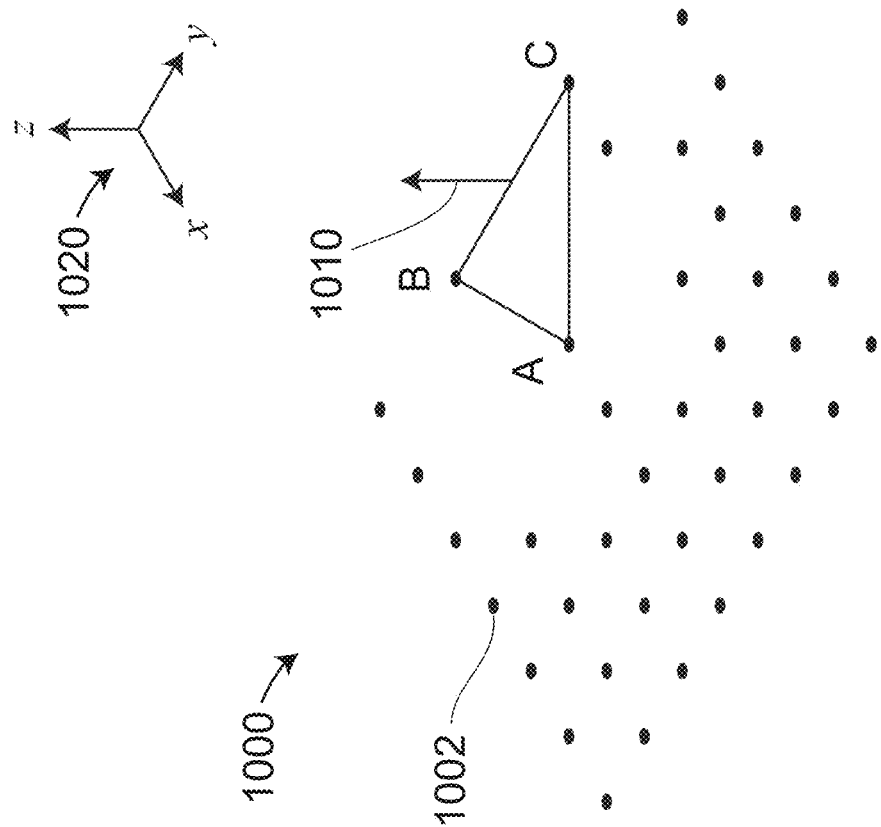
FIGS. 10A, 10B are top and isometric views, respectively, of 3D scan points on an object surface according to an embodiment.
Figure 10A:
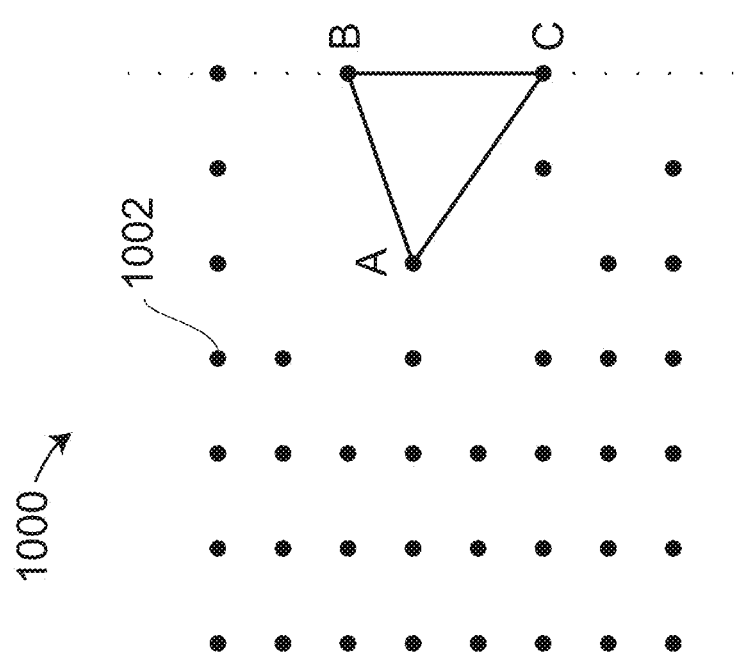

FIG. 10A is a top view of a collection 1000 of 3D scan points 1002 projected with a uniform grid on a flat horizontal surface. Such a collection of scan points might be obtained, for example, by the 3D scanner 100. To the left side of the collection 1000, the points are uniformly spaced, but on the right side of the collection, some scattering defects on the surface of the object has caused some of the reflected points to be lost. Consequently, there is a gap in the reflected 3D grid spanned by vertices of the triangle A-B-C. In an embodiment, each vertex of the triangle A-B-C corresponds to a spot projected by the 3D scanner 100.

Some embodiments a technical effect is to provide photogrammetry information obtained from a camera, for example the texture camera 113, to increase the density of 3D points on a scanned surface. In additional embodiments, another technical effect applies additional texture information, such as color information, to the newly created 3D photogrammetry points. In an embodiment, the collected 3D scan points 1002 are known to a relatively high 3D accuracy over a relatively large surface area. The collected 3D scan points 1002 are regarded as trusted anchor points onto which the photogrammetry data can be accurately appended. As used herein, the term "trusted" means that there is a high level of confidence that the scan points were accurately measured.

After 3D coordinates are obtained from a device such as a scanner, a common procedure is to "mesh" the points to obtain a representative surface. Such meshing usually involves forming triangles or other shapes from determined 3D coordinates. In some cases, such 3D coordinates may be filtered or smoothed, either before or after meshing.

FIG. 10B is an isometric view of the collection 1000 of the 3D scan points 1002. A normal vector 1010 perpendicular to the plane of the triangle A-B-C is drawn to intersect the line B-C. The triangle A-B-C may be regarded as a triangle from a mesh and the plane of the triangle A-B-C may be regarded as a face of the meshed element A-B-C. Since no trusted anchor point was obtained for the region between the points B and C, a method is now described for finding a 3D coordinate in the region between B and C based on the data obtained from a camera in a plurality of different poses. In an embodiment, this camera is the texture camera 113, but in other embodiments described herein below, cameras in many other types of 3D measuring instruments, both contact and non-contact 3D measuring instruments, may be used to fill in gaps between trusted 3D anchor points obtained from the 3D measuring instruments. In still other embodiments described herein below, a camera separate from the 3D measuring instrument may be used to fill in missing 3D coordinates. For convenience in the following discussion, a coordinate system 1020 is defined in which the z axis coincides with the normal vector and the collection 1000 of the 3D scan points 1002 fall on a plane parallel to an x-y plane.

The term "pose" as used herein refers to a combination of position and orientation of a 3D measuring instrument or camera. Another term used to represent a combination of a position and an orientation is six degrees-of-freedom (DOF), also referred to as six-DOF. For a handheld instrument such as the 3D measuring device 100, the pose of the 3D measuring instrument changes continually as a user moves the device 100 to scan the surface of an object. For the case of the 3D measuring device 100, the poses for the plurality of camera images are determined at least partly based on features identified by a processor as being common to the camera images. In an embodiment, such identified features from the plurality of camera images are marked by flags 133 as illustrated in FIGS. 4, 6, 7. In addition, the determined poses may be further determined based on self-consistency checks/attributes of the 3D coordinates as measured by the 3D measuring device within its own frame of reference. For example, in some embodiments, 3D coordinates of surfaces obtained in two frames of the 3D measuring device are used to provide a self-consistency check on features 133 seen in the plurality of camera images.

Figure 11:
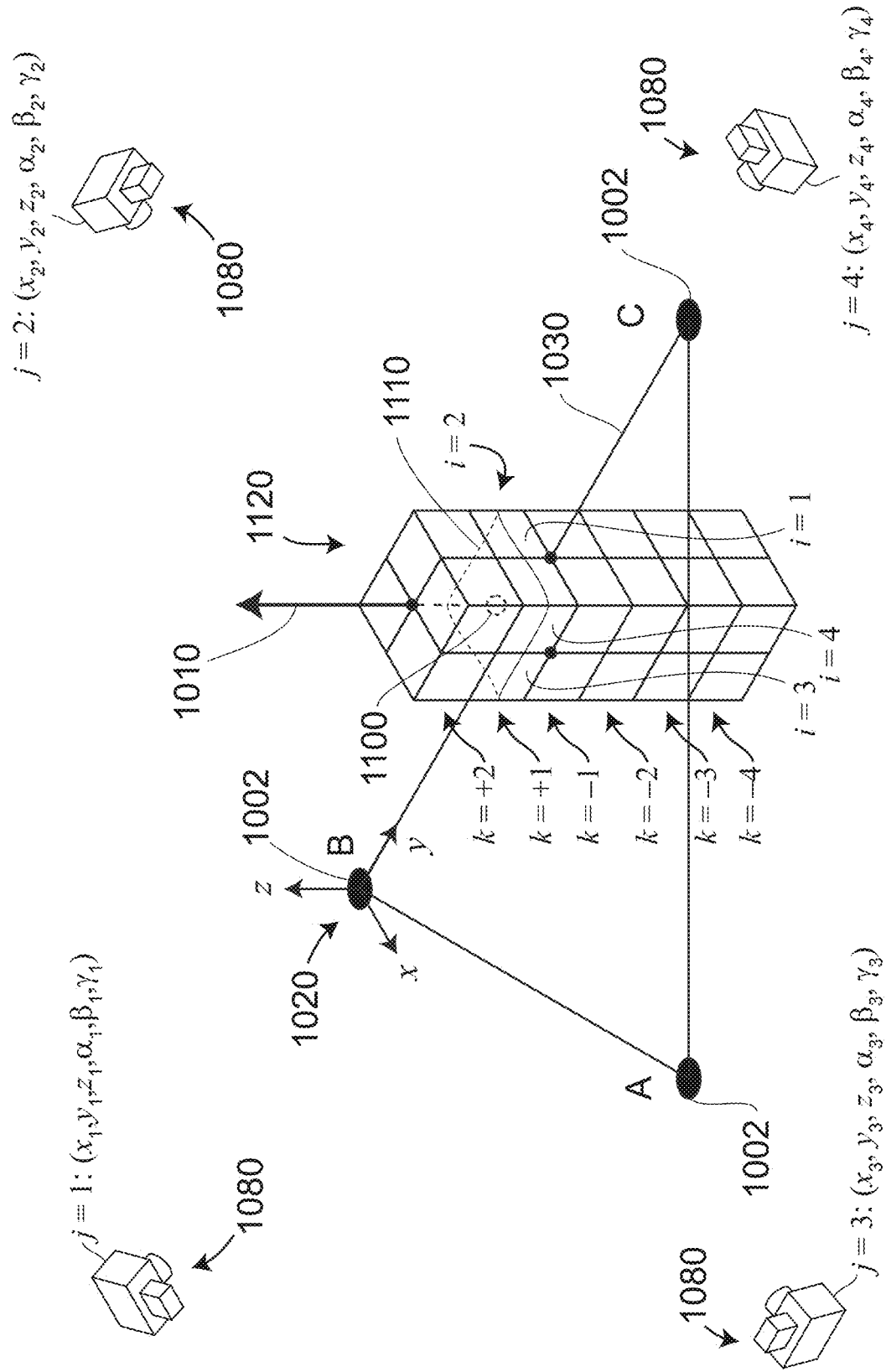
FIG. 11 is a view of three 3D scan points onto which a voxel array has been superimposed for viewing by a camera in multiple poses according to an embodiment.

FIG. 11 is a schematic illustration of an exemplary method for combining measured 3D coordinates of points such as the points 1002 obtained from a 3D measuring instrument with 3D coordinates obtained from photogrammetry camera 1080 in each of a plurality of different poses. In the example of FIG. 11, the camera 1080 has four different poses labeled by an index j having values j=1, 2, . . . , 4. Pose of the camera 1080 may be represented by six values, sometimes referred to as the six degrees-of-freedom (DOF) of the camera 1080. For example, for the camera 1080 in the pose j=1, the pose is described by the three positions $x_1$, $y_1$, $z_1$ and three orientations $\alpha_1$, $\beta_1$, $\gamma_1$. Orientations could be described, for example, by pitch, yaw, and roll angles. In an embodiment, the camera 1080 is rigidly coupled to a device that measures 3D coordinates of the points 1002. In other embodiments, the camera 1080 is separated from the device that measures the 3D coordinates of the points 1002. In the latter case, a method is provided for linking the images obtained by the photogrammetry cameras to the measured 3D points 1002. This is discussed further herein below.

In some embodiments, as described herein, is to determine 3D coordinates of points at a finer scale than that provided by measurements of the points such as the points A, B, C obtained by the 3D measuring device. In the example of FIG. 11, a straight line 1030 is drawn between the points B, C measured by the 3D measuring device. The frame of reference 1020 has been constructed to have an origin at B, a y axis along the line 1030, and a z axis perpendicular to the plane that includes the points A, B, C. In other embodiments, other frames of reference are used. In general, a point on an actual object that includes the points A, B, C may not fall exactly on the line 1030. In an embodiment illustrated in FIG. 11, the actual surface of the object being measured is the surface 1110. The point that is to be determined is the point 1100, which is an estimate of the surface 1110 directly above the line 1030. In an embodiment, a grid of voxels 1120 is constructed to have edges aligned to the frame of reference 1020. The grid of voxels 1120 is also referred to as a voxel array. In an embodiment, a position is determined in the z direction that estimates the surface at a particular position along the line 1030.

To determine a z value of the point 1100 that best estimates the surface 1110 at a point 1100 directly above the line 1030, the voxel array 1120 is constructed about a vertical axis 1010 parallel to the z axis. There are many ways to construct such a collection of voxels but, in a simple example, rows of voxels are constructed in the voxel array 1120. In an embodiment, each row of voxels is labeled with an integer k index. In this example, the row of voxels just below the line 1030 has a value of −1 and the row of voxels just above the line 1030 has a value+1 just above the line 1030. Voxel rows in FIG. 11 are labeled k=−4, −3, . . . , +2. In the example of FIG. 11, the actual surface 1100 falls within the voxel row k=+1. Furthermore, the point 1100 falls partway between the plane z=0 and the top of the k=+1 row of voxels.

There are many strategies that can be used in constructing a voxel array 1120. In the example of FIG. 11, each row of voxels includes four voxels labeled with an index i=1, 2, 3, 4. In an embodiment, a projection is made from each voxel to an image plane of the camera 1180 at each of the poses. In each case, a ray projected from the voxel to the camera 1080 passes through a perspective center of the camera lens system on its way to the image plane of the camera 1080. The projected ray from the voxel arrives at a pixel of the camera image plane. That pixel will have pixel values or pixel characteristics, which will usually include at least a level value related to the number of electrons in an electron well of the pixel. Such a level value is sometimes referred to as an intensity level or a gray level. The pixel may also include color subpixels, each subpixel having a wavelength response curve. The most common type of subpixels are red, green, and blue subpixels, so designated by the wavelength range at which their responsivity is high or a maximum. Such color values may be processed in many ways, as discussed further herein below. For the moment, the analysis below considers the case in which the camera 1080 provides a single color or a single gray level as values for each pixel. However, it is also possible to provide multiple values for each pixel. In the discussion that follows, the term "voxel value" is used to refer to gray level, color, or other pixel response characteristic associated with a particular voxel.

Equation (1) below is a matrix W of voxel values $u_{ij}$ of the constructed voxel array 1120 for a particular voxel row k. Values $u_{ij}$ in the matrix are given for each voxel index i=1, 2, . . . , M and each pose index j=1, 2, . . . , N. A table such as that in Eq. 1 may be constructed for each row index k.

$$W = \begin{bmatrix} u_{11} & u_{12} & u_{13} & \cdots & u_{1N} \\ u_{21} & u_{22} & u_{23} & \cdots & u_{2N} \\ u_{31} & u_{32} & u_{33} & \cdots & u_{3N} \\ \vdots & & \ddots & & \vdots \\ u_{M1} & u_{M2} & u_{M3} & \cdots & u_{MN} \end{bmatrix} \quad \text{(Eq. 1)}$$

Each $u_{ij}$ of the matrix W indicates the value of the pixel corresponding to the projected ray from the voxel onto the image plane of a particular camera. For example, suppose the current voxel row is k=+1 and a particular voxel within that row is $u_{11}$. For FIG. 11, that value $u_{12}$ corresponds to the voxel having the voxel index i=1, as shown in FIG. 11, and the pose index j=1, which corresponds to the camera having the six-DOF pose values $x_1, y_1, z_1, \alpha_1, \beta_1, \gamma_1$. If the row k=+1 corresponds to a row of voxels lying encompassing the surface 1110, the voxel values (e.g., color or gray level values) for a voxels on the voxel row k=+1 would be expected to be more similar for the different camera poses j=1, 2, 3, 4 than would be the case for other rows, k≠+1. This can be seen by noticing that, for voxel rows far away from the surface 1110, the ray from the voxel to the pixel on the camera array does not correspond to the relevant region of the surface 1110 and hence would not be expected to produce similar voxel values (e.g., colors) off the voxel row k=+1.

There are many mathematical procedures that can be used to obtain a z value for the point 1100. One such procedure is now described and discussed. In an embodiment, normalized functions $\hat{f}$ and $\hat{g}$ j are defined as $$\hat{f}_{ij} = (u_{ij} - \bar{u}_j)/\sqrt{\Sigma_{i=1}^{M}(u_{ij} - \bar{u}_j)^2}, \quad \text{(Eq. 2)}$$

$$\hat{g}_i = (\bar{u}_i - \bar{u})/\sqrt{\Sigma_{i=1}^{M}(\bar{u}_i - \bar{u})^2}, \quad \text{(Eq. 3)}$$

where $$\bar{u}_j = \Sigma_{i=1}^{M} u_{ij}/M, \quad \text{(Eq. 4)}$$

$$\bar{u}_i = \Sigma_{j=1}^{N} u_{ij}/N, \quad \text{(Eq. 5)}$$

$$\bar{u} = \Sigma_{i=1}^{M}\Sigma_{j=1}^{N} u_{ij}/(MN). \quad \text{(Eq. 6)}$$

The numerator of the function $\hat{f}_{ij}$ is $u_{ij}-\overline{u}_j$. The quantity $u_{ij}$ is the value of the voxel having index i as seen by the camera at pose. The quantity $\overline{u}_j=\Sigma_{i=1}^M u_{ij}/M$ from Eq. (4) is the average value of voxels having indexes i=1, 2, ..., M as seen by the camera at pose. The denominator of the function ij is the normalization constant $\sqrt{\Sigma_{i=1}^M(u_{ij}-\overline{u}_j)^2}$. All of the values $\hat{f}_{ij}$ are between −1 and +1.

The numerator of the function $\hat{g}_i$ is $\overline{u}_i-\overline{u}$. The quantity $\overline{u}_i$ from Eq. (5) is $\overline{u}_i=\Sigma_{j=1}^N u_{ij}/N$, which is value of the voxel at index i when averaged over all N poses. The denominator of the function is the normalization constant $\sqrt{\Sigma_{i=1}^M(\overline{u}_i-\overline{u})^2}$. The value $\overline{u}=\Sigma_{i=1}^M\Sigma_{j=1}^N u_{ij}/(MN)$ is the average value of all voxels as seen by the camera over all M poses.

A cross-correlation value $\rho_j$ for the pose j is given by $$\rho_j=\Sigma_{i=1}^M \hat{f}_{ij}\hat{g}_i, \quad (Eq.\ 7)$$

which can be seen to be an inner product of the matrix functions $\hat{f}_{ij}$ and $\hat{g}_i$ over the voxel index i. The cross-correlation value $\rho_j$ varies over the pose index j for any given voxel row k.

The numerator of the normalized function $\hat{f}_{ij}$ is the value at a particular voxel i and pose j minus the average of values of all the voxels i=1, 2, ..., M for that pose. In an embodiment, the normalization is carried out with respect to a root-sum-squared (RSS) magnitude of the terms in the numerator taken over all voxels i=1, 2, ..., M. In other embodiments, other types of normalizations may be used.

The numerator of the normalized function $\hat{g}_i$ is the value at a particular voxel i averaged over all poses j=1, 2, ..., N minus an average taken over all voxels i=1, 2, ..., M and all poses j=1, 2, ..., N. In an embodiment, the normalization is carried out with respect to an RSS magnitude of the terms in the numerator taken over all voxels i=1, 2, ..., M and poses j=1, 2, ..., N.

The cross-correlation value $\rho_j=\Sigma_{i=1}^M \hat{f}_{ij}\hat{g}_i$ can therefore be understood to indicate a cross-correlation of (1) $\hat{f}_{ij}$, which is averaged voxel values for a particular pose j, and (2) § i, which is averaged voxel values further averaged over all poses j. It would therefore be expected that voxels near a surface 1110 would be similar in the determined cross-correlation values pi over the range of poses j. A way to quantify this idea is to define an optimization function, here referred to as an objective function having a value E. In an embodiment, an objective function value (also referred to as a quality factor) is given as a ratio of a mean μ to a variance $\sigma^2$:

$$E=\mu/\sigma^2, \quad (Eq.\ 8)$$

where $$\mu=\Sigma_{j=1}^N \rho_j/N, \quad (Eq.\ 9)$$

and $$\sigma^2=\Sigma_{j=1}^N(\rho_j-\mu)^2/N. \quad (Eq.\ 10)$$

In other embodiments, the objective function value E is defined more generally as an average or measure of central tendency divided by a dispersion. Examples of averages (or measures of central tendency) include mean, median, and mode. Examples of dispersion include variance, standard deviation, and range. Further, although the objective function value E in Eq. 8 is defined in terms of cross-correlation values $\rho_j$, the objective function value E may be defined in other ways, as further described herein below.

In an embodiment, the z coordinates of the point 1100 in FIG. 11 is determined based on a linear interpolation among the values E for different rows k, for example, for the rows k=−1, +1, +2.

Figure 12A:
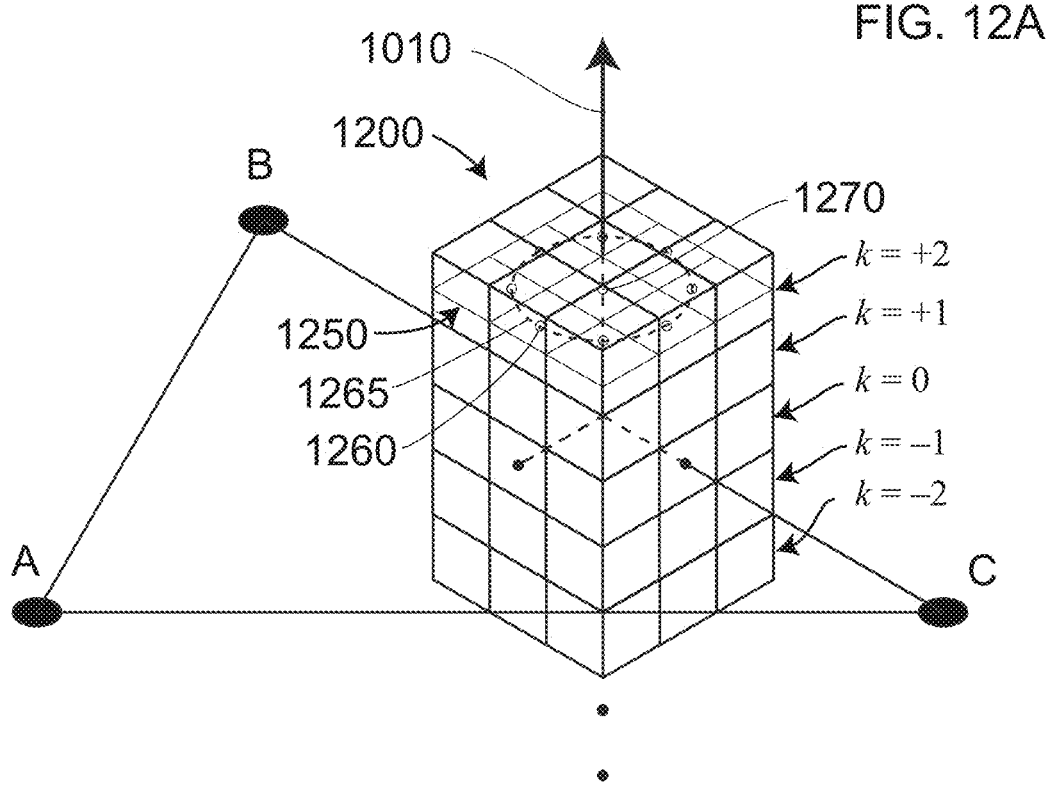
FIG. 12A is a view of a voxel array in which points surrounding a central voxel points provide weighting for nearest neighbor voxels according to an embodiment.

In the method illustrated in FIG. 11, each row includes four voxels indexed i=1, 2, 3, 4. In other embodiments, there are more or fewer voxels on each voxel row. FIG. 12A illustrates a case in which each row includes an array 1200 of voxels in a 3×3 grid. In this case, the voxels have indexes i=1, 2, ..., 9. A normal vector 1210 perpendicular to the plane of the triangle A-B-C is drawn to intersect the line B-C. In an embodiment, the voxel array 1200 is positioned to center the voxel array 1200 on the center of the voxel on k=0. This positioning of the voxel array 1200 is different than the positioning of the voxel array 1120 at the intersection of the voxel rows k=−1 and k=+1 in FIG. 11, but this choice is arbitrary.

Figure 12B:
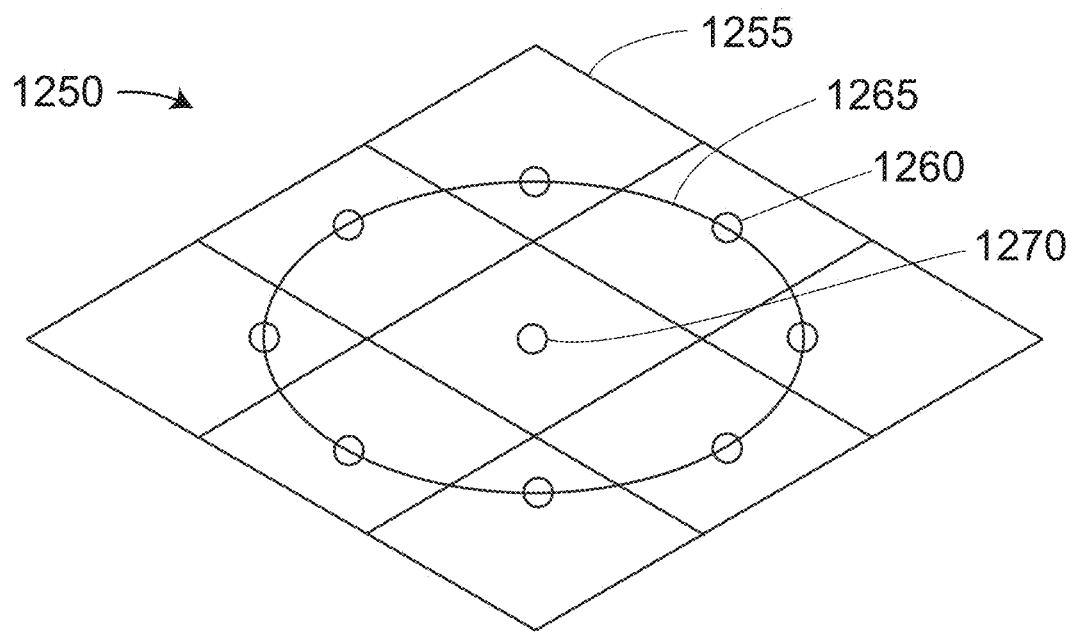
FIG. 12B is a view of a slice through one row of the voxel array, with weighing points arranged on the slice, according to an embodiment.

In some embodiments, points used in calculations are not centered on voxels but are rather placed at other geometrical locations. For example, FIG. 12B shows a grid 1255 formed on a slice 1250 taken through the center of voxel row k=+2. In this case, points 1260 are spaced evenly on a circle 1265 centered on a central voxel 1270. In an embodiment, a value is calculated for the collection of points 1260 and the central point 1270. In various embodiments, the circles 1260 are assigned weights according to their positions within the grid. In an embodiment, the values of the voxels for each grid section in the slice 1250 are combined according to weights given by a prescribed algorithm. In an embodiment, the resulting weighted value is centered on the line and dropped down directly below the point 1270. Interpolation between slices on different levels such as the levels k=−2, −1, ..., +2 are carried out to determine the estimated z value of a point on the actual surface above the line B-C.

The method described above with respect to equations 1-10 describes an exemplary embodiment for determining an offset distance z of a point 1100. More generally, the method can be understood to determine a distance from a point on a first face to an object surface based at least in part on the determined quality values for the voxel rows, wherein the quality values are determined for a given voxel row based at least in part on a ratio of average value of a first quantity to dispersion of the first quantity, the first quantity being based at least in part on first voxel values determined as a function of pose. Furthermore, a large number of 3D coordinates may be determined for any given mesh element. For example, for a high-resolution camera, offset distances z can be determined for many points within the mesh triangle A-B-C.

Figure 13:
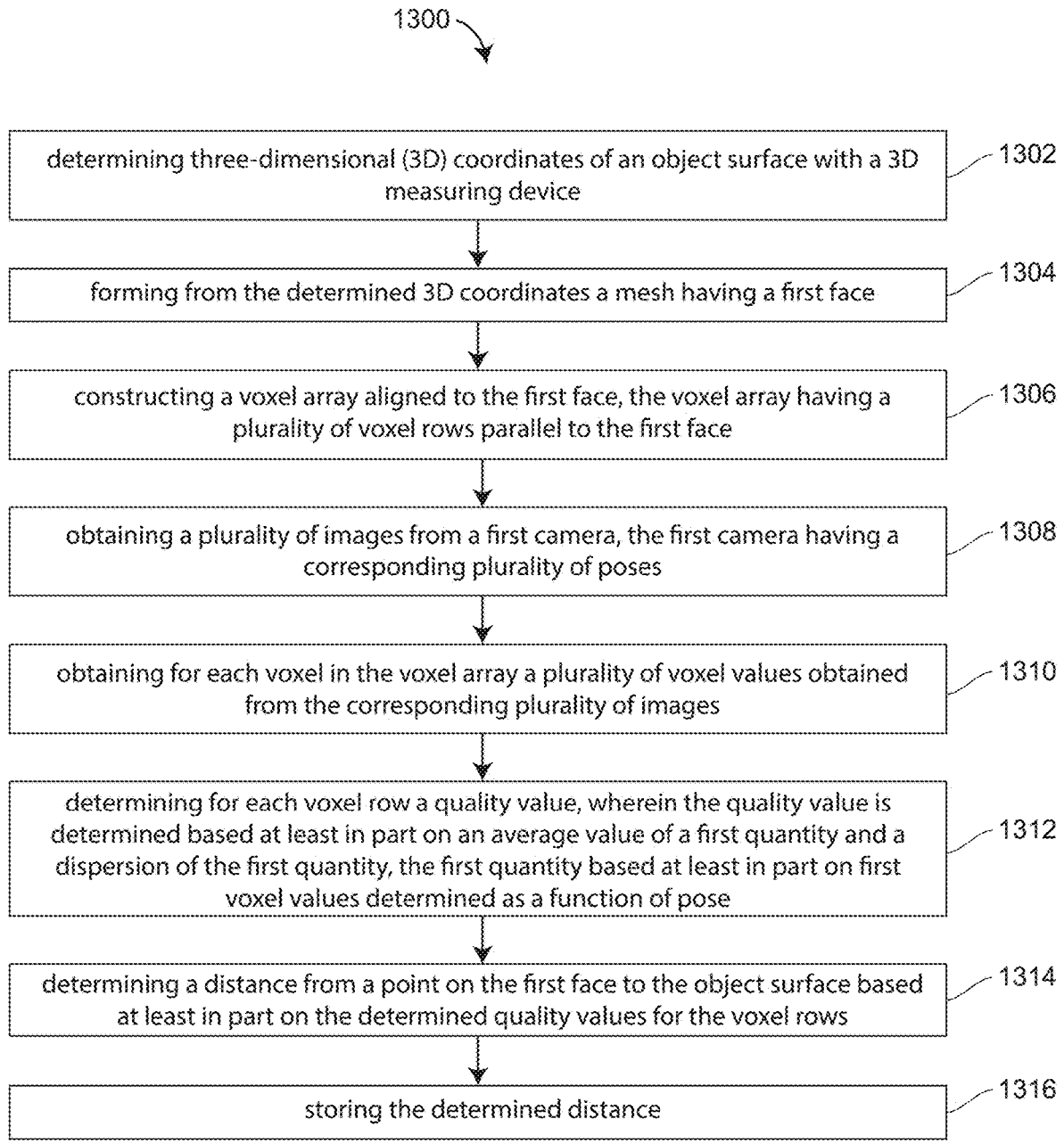
FIG. 13 is a diagram illustrating elements of a method according to an embodiment.
Figure 14:
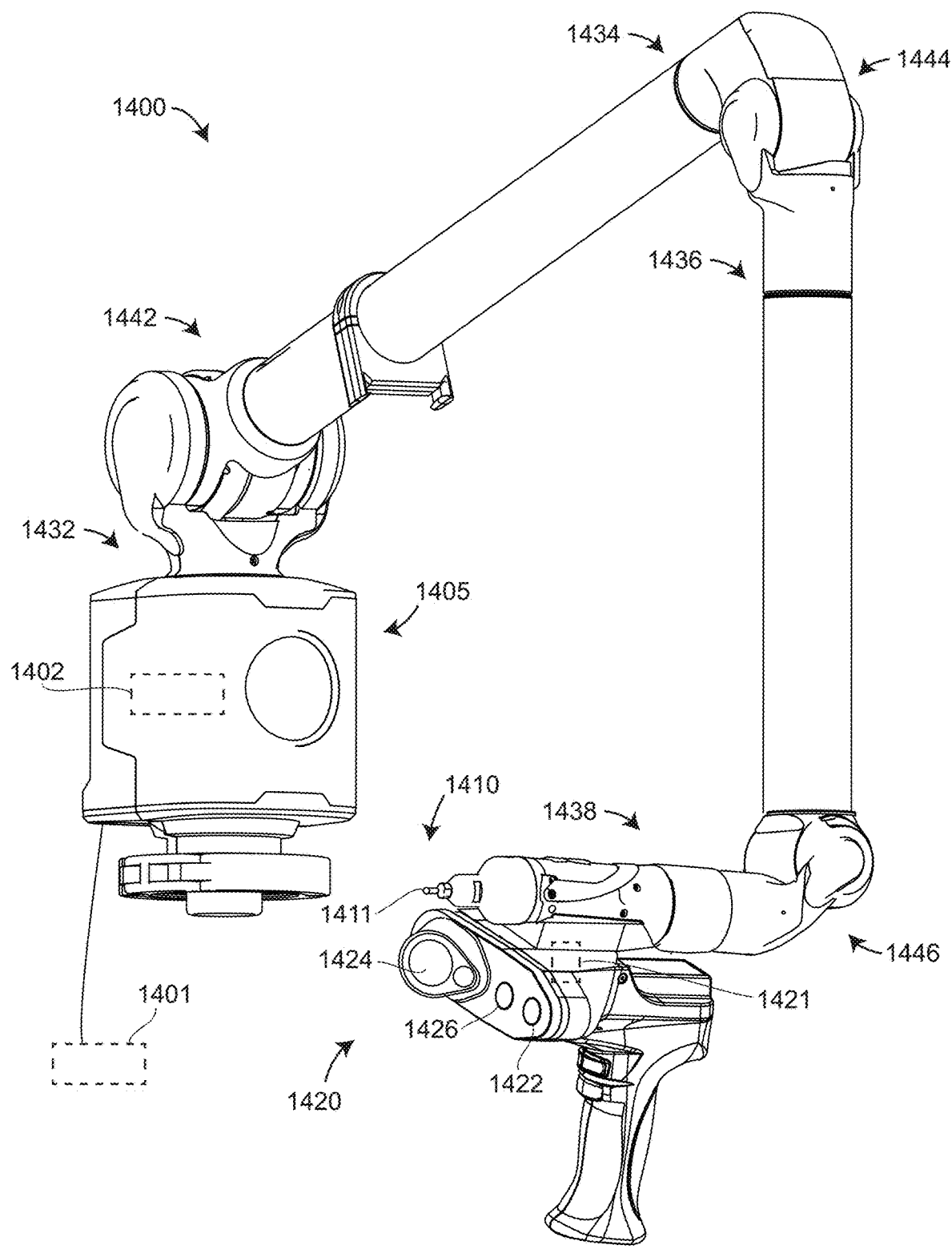
FIG. 14 is an isometric view of an articulated arm coordinate measuring machine (AACMM) attached to a laser line probe (LLP) according to an embodiment.
Figure 15:
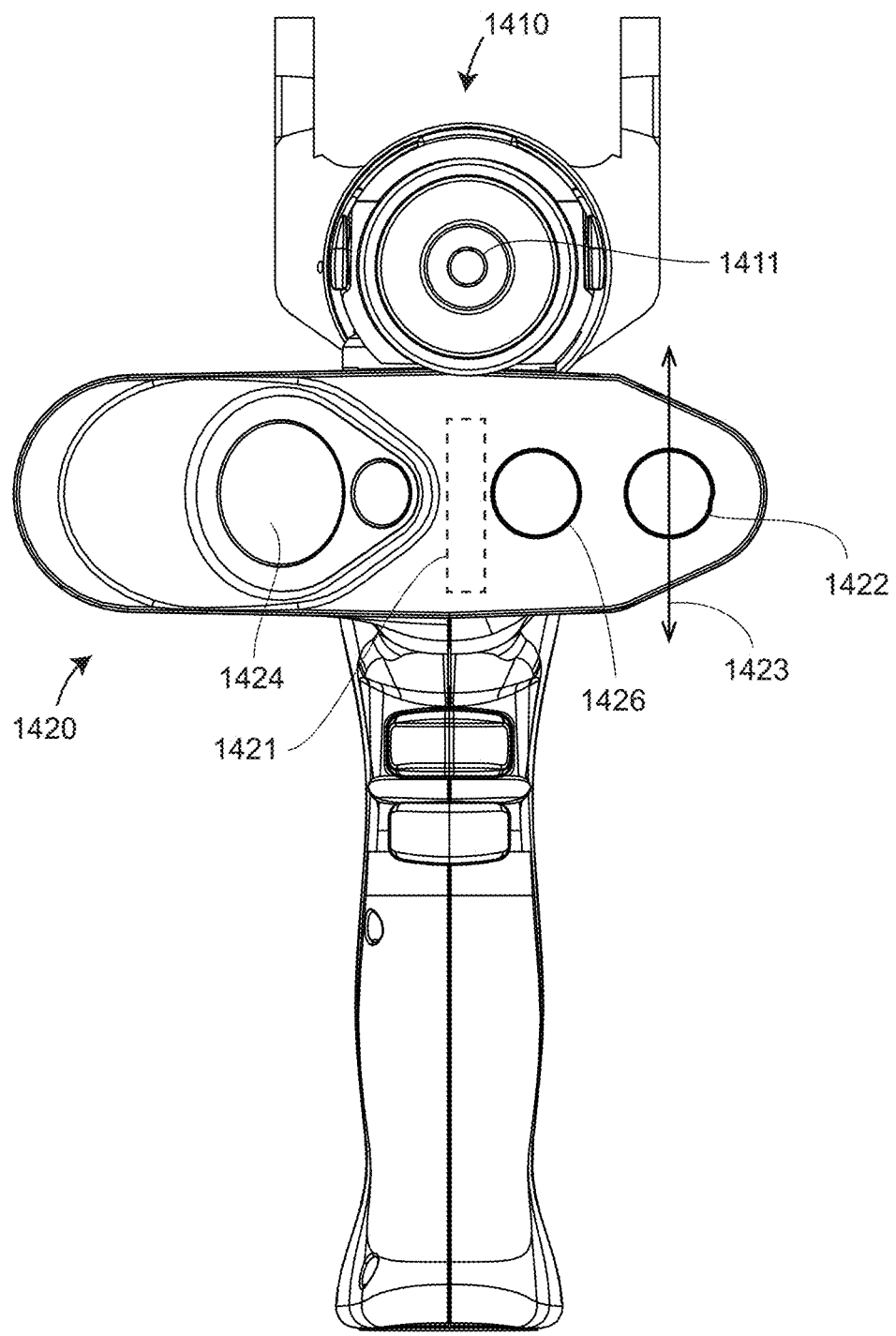
FIG. 15 is a front view of an LLP affixed to a portion of an AACMM according to an embodiment.
Figure 16:
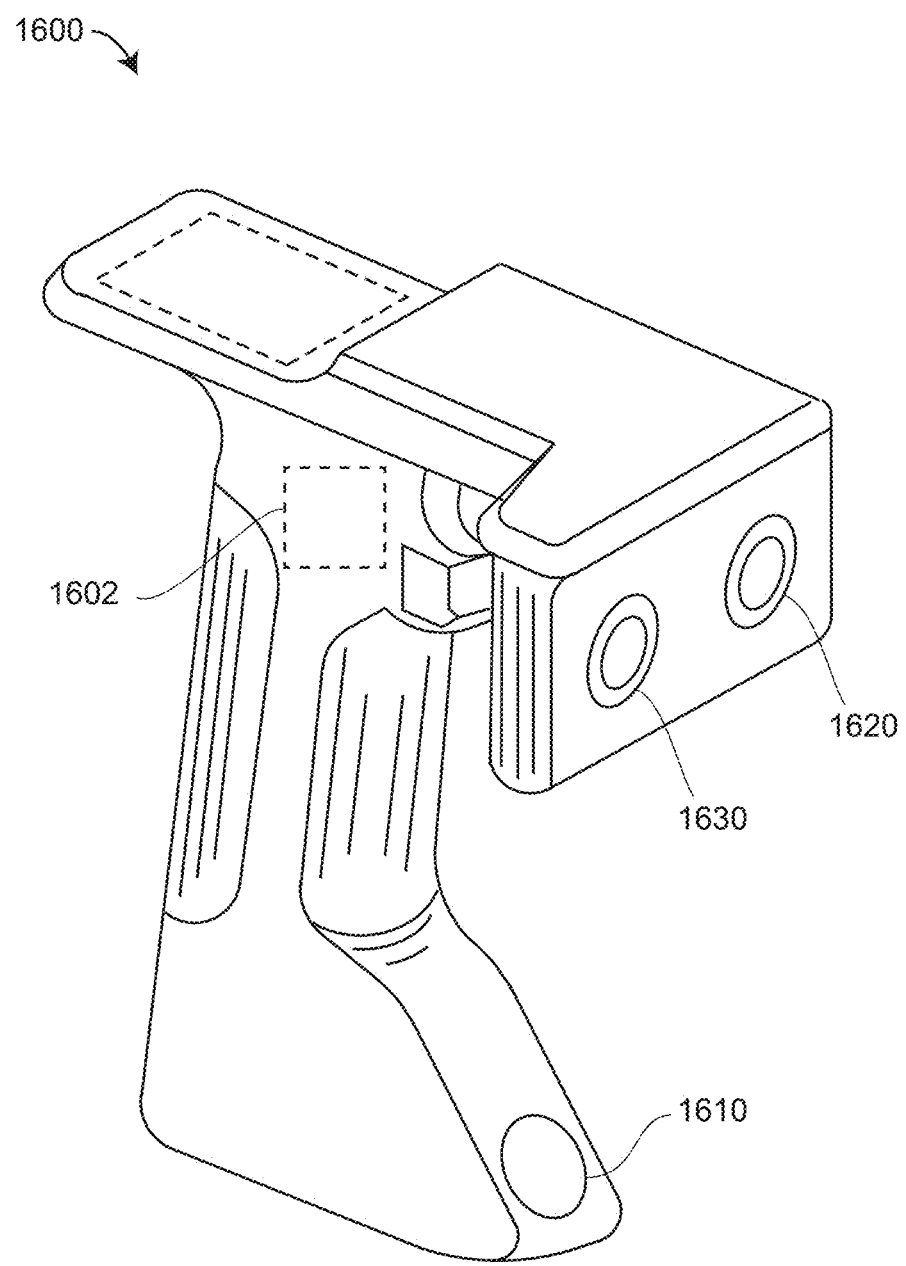
FIG. 16 is an isometric view of an area scanner according to an embodiment.

FIG. 13 describes elements of such a method 1300. In an embodiment, a method includes an element 1302 of determining 3D coordinates of an object surface with 3D measuring device. A variety of 3D measuring devices may be used. Examples include a triangulation scanner such as the scanner 100, a laser line scanner 1420 as shown in FIGS. 14, 15, or a structured light area scanner as shown in FIG. 16. Other examples include time-of-flight (TOF) scanners such as the scanner 1700 in FIGS. 17, 18 that use modulated light to determine distance. Such TOF scanners include phase-based scanners, pulsed TOF scanners, and frequency modulated continuous wave (FMCW) scanners. Further examples of 3D measuring devices include articulated arm coordinate measuring machines (AACMMs), such as the AACMM 1400 shown in FIG. 14, and laser trackers, such as the laser tracker 1900 shown in FIG. 19.

In an embodiment, the 3D measuring devices may alternatively be a photogrammetry measuring device in combination with a scale. The photogrammetry device may include one or more cameras that used to captured images of an object from a number of different positions. Common features within these multiple images may be used to obtain an unscaled 3D images. By measuring a scale artifact or points separated by a known distance, a scale may be applied to the unscaled 3D images to obtain a complete 3D representation of an object.

The method 1300 further includes an element 1304 of forming from the determined 3D coordinates a mesh having a first face. An example of a first face in a mesh is the surface of the triangle A-B-C in FIGS. 10A, 10B, 11, 12A.

The method 1300 further includes an element 1306 of constructing a voxel array aligned to the first face, the voxel array having a plurality of voxel rows parallel to the first face. Examples of voxel arrays are the array 1120 in FIG. 11 and the array 1200 in FIG. 12A.

The method 1300 further includes an element 1308 of obtaining a plurality of images from a first camera, the first camera having a corresponding plurality of poses. An example of a first camera is the camera 1080 shown in the poses j=1, 2, 3, 4 in FIG. 11 and having pose indexes j=1, 2, ..., N in the equations 1-10. In some embodiments, the first camera is fixedly coupled to the 3D measuring device, while in other embodiments the camera is detached from the 3D measuring device. An example of a first camera fixedly coupled to the 3D measuring device is the texture camera 113 shown in FIG. 2. In this case, the camera 113 may serve two purposes: (1) providing registration points for the scanner 100 and (2) providing the plurality of images in the element 1308. An example of a camera detached from the 3D measuring device is a photogrammetry camera that is moved to a plurality of poses to capture images of the region occupied by the voxel array.

The method 1300 further includes an element 1310 of obtaining for each voxel in the voxel array a plurality of voxel values obtained from the corresponding plurality of images. For example, consider the image obtained by the camera 1080 at the pose j=2 in FIG. 11. Each voxel i=1, 2, 3, 4 in a particular row of the voxel array—for example, the voxel row k=+1—has a corresponding voxel value. The voxel value for a particular voxel i is obtained by projecting a virtual line from that particular voxel i through the perspective center of the camera 1080 in the pose j=2. A value provided by the intersected pixel is assigned as the voxel value. The voxel value may, for example, be a gray scale associated at least in part with an optical power received by the pixel, or it may correspond to a color corresponding to the wavelengths received by the pixel. The voxel value may also be formed by some other combination of information provided by the pixel. For example, the combination of received wavelengths (colors) may be used to synthesize an equivalent gray scale value. Furthermore, a variety of methods may be used to determine a representative color based on values of red, green, and blue provided by a given pixel. Other representations for color could also be provided. For example, color could be expressed in terms of hue-saturation-lightness (HSL), hue-saturation-value (HSV), or hue-saturation-brightness (HSB).

The method 1300 further includes an element 1312 of determining for each voxel row a quality value, wherein the quality value is determined based at least in part on an average value of a first quantity and dispersion of the first quantity, the first quantity based at least in part on first voxel values determined as a function of pose. In an embodiment, the quality factor is further based on a ratio of the average value of the first quantity to the dispersion of the first quantity. In an embodiment, the quality factor is relatively high when the variation (dispersion) in voxel values for a given voxel row over the range of poses is relatively low compared to the average of voxel values over that same range of poses. For example, if for the voxel row k=+1 the voxel values are based on gray scale and all the voxels in the given row have nearly identical gray scale values, then that row will have a quality factor that is relatively high.

The method 1300 further includes an element 1314 of determining a distance from a point on the first face to the object surface based at least in part on the determined quality values for the voxel rows. If a voxel row has a quality factor that is relatively high, then it is likely that that voxel row is close to the object surface since each of the images obtained for each of the poses produce images that are very similar. For voxel rows distant from the object surface, it is likely that the determined voxel values for those rows will not be as similar since different portions of the object are being imaged from the different poses and, in some cases, are out of focus when seen from the different poses or are imaging different portions of the surface when seen from the different poses. The determined quality factors, therefore, enable a perpendicular distance z to be calculated from a given voxel row to the object surface. In an embodiment, the determined perpendicular distance is further based on an interpolation among quality factors for different voxel rows. The method 1300 further includes an element 1316 of storing the determined distance.

FIG. 14 is a perspective view of an articulated arm coordinate measuring machine (AACMM) 1400 that includes a tactile probe 1410 as well as a laser line probe (LLP) 1420, which is also referred to as a laser line scanner. In an embodiment, the AACMM 1400 includes a base 1405 as well as seven rotational elements, and hence is referred to as a seven-axis AACMM. In an embodiment, these rotational elements include four swiveling elements 1432, 1434, 1436, 1438 and three hinge elements 1442, 1444, 1446. In other embodiments, other types of rotational elements are included. Each of the rotational elements includes an angular transducer such as an angular encoder that measures its angles of rotation. A processor 1402 within the AACMM 1400 or attached as a unit 1401 to the AACMM 1400 determines the 3D coordinates of a probe tip 1411 of the tactile probe 1410 and of the 3D coordinates of an object probed with light from the LLP 1420. In an embodiment, the LLP 1420 includes a projector 1422 and a camera 1424. The projector 1422 projects onto an object a line of light, which is imaged by the camera 1424. A processor 1421 coupled to the LLP 1420 uses the principles of triangulation to determine the 3D coordinates of points on the object illuminated by the line of light. In some embodiments, the AACMM 1400 further includes a texture camera 1426, which may be used to capture high resolution, color images. In other embodiments, the camera 1422 serves both as a part of the triangulation system and as a texture camera.

In an embodiment further illustrated in FIG. 15, the AACMM 1400 measures a collection of points on an object with the probe tip 1411 of the tactile probe 1410 or with the projected laser line 1423 of the LLP 1420. In an embodiment, the probe tip 1411 captures a sparse collection of high accuracy 3D coordinates. While these measurements are being taken, one or more cameras such as the camera 1424 or 1426 captures images of the object under test from a number of different poses. The image data provided by the camera 1422 or 1426 provides high density 3D coordinates that are placed in relation to the trusted anchor points that are the 3D coordinates obtained by the probe tip 1411 or the LLP 1420. The camera 1422 or 1426 may further provide color information or other texture information. In an embodiment, the method 1300 of FIG. 13 is used to obtain the high-density 3D coordinates of the object surface.

FIG. 16 is an isometric view of a triangulation scanner 1600 that may be attached to the AACMM 1400 in place of the LLP 1420 or may be used stand-alone as a handheld device detached from the AACMM 1400. The triangulation scanner 1600 includes a projector 1610 fixedly attached to a first camera 1620 and, optionally, to a second camera 1630. In an embodiment, the projector 1610 projects a line of light onto an object, which is imaged by the camera 1620. A processor 1602 within the scanner 1600 or attached to the scanner 1600 uses triangulation to determine 3D coordinates of points on the object intersected by the projected line of light. In another embodiment, the projector 1610 projects onto the object a two-dimensional (2D) pattern of light over an area of the object rather than along a line of light, which is then captured by the camera 1620. A processor matches elements in the projected pattern of light to corresponding elements in the image captured by the camera. A further description of such an area scanner affixed to an AACMM is described in the commonly owned U.S. Pat. No. 8,832,954 issued on Sep. 16, 2014, to Atwell et al. In an embodiment, either the camera 1620 or the camera 1630 further obtains texture data, which it uses to obtain high density surface information according to the method 1300 of FIG. 13.

Figure 17:
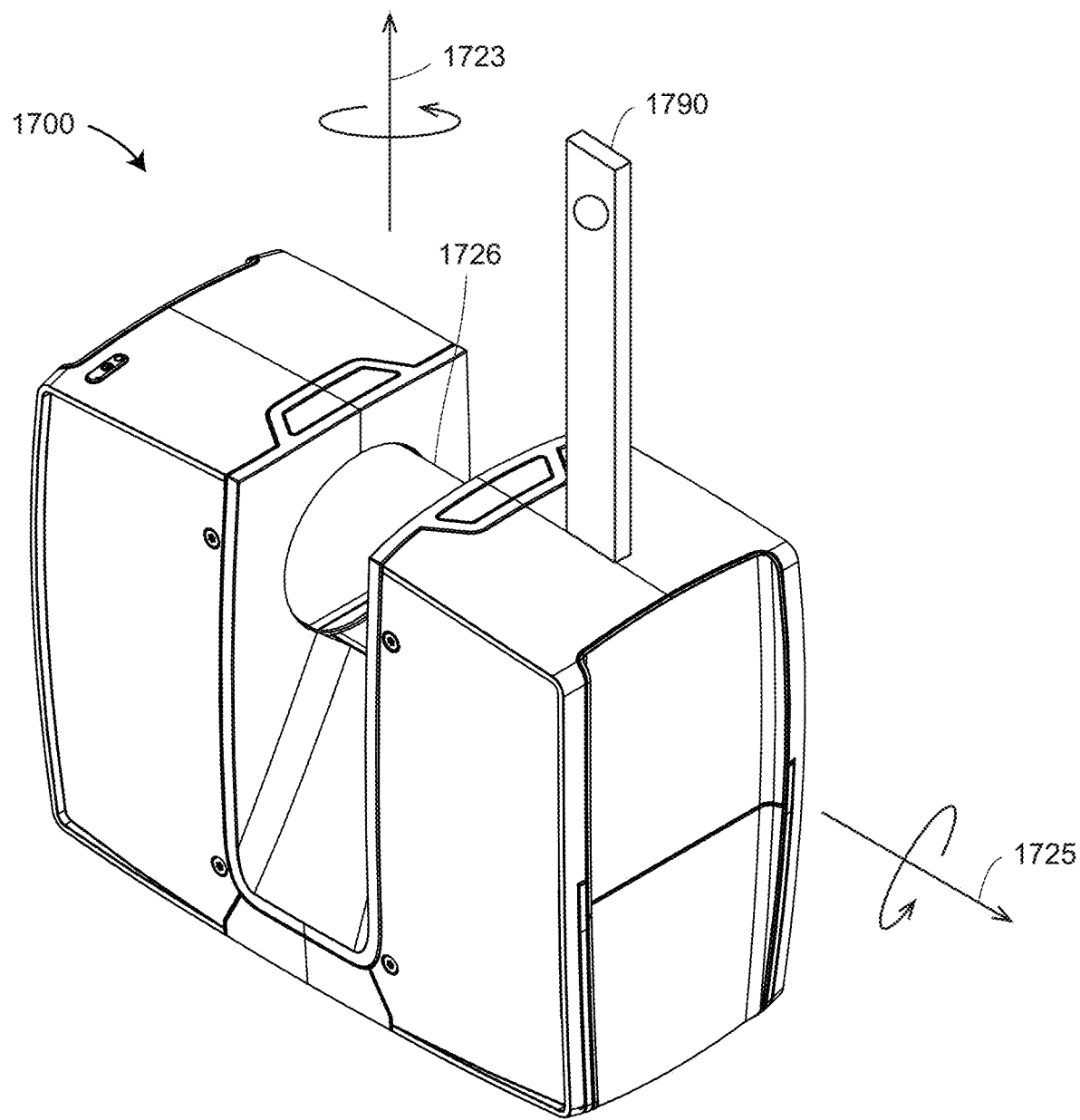
FIG. 17 is an isometric view of a time-of-flight (TOF) scanner according to an embodiment.
Figure 18:
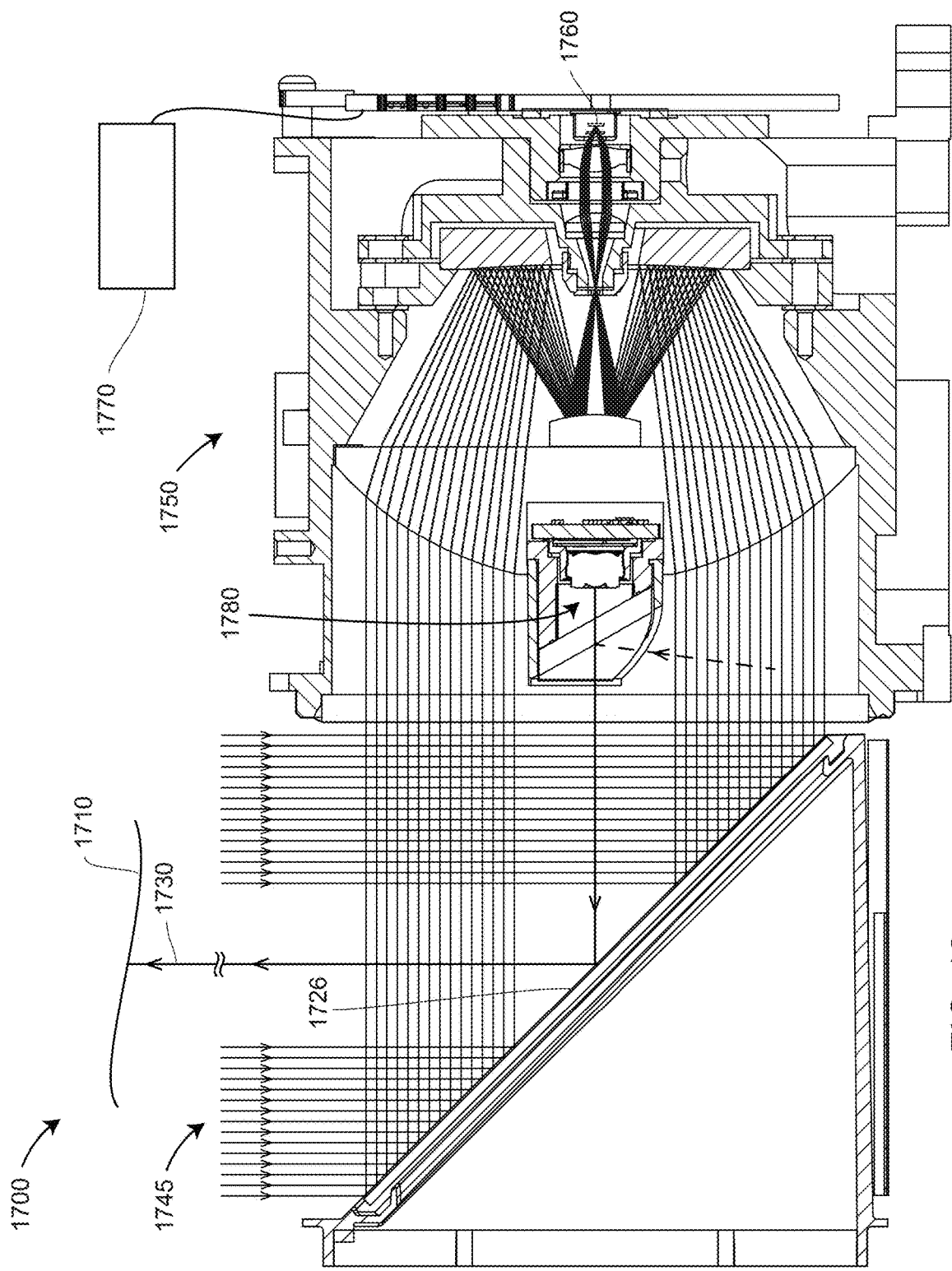
FIG. 18 is a cross sectional view of a time-of-flight (TOF) scanner according to an embodiment.

FIGS. 17, 18 are perspective and partial sectional views, respectively, of a time-of-flight (TOF) scanner 1700 that launches a beam of light 1730 onto an object 1710 and determines 3D coordinates of points on the object surface based on light returned to the scanner. In an embodiment, the scanner 1720 rotates relatively slowly about a vertical axis 1723, while a rotary mirror 1726 rotates relatively quickly about a horizontal axis 1725. Light scattered off the object 1710 returns to the rotary mirror 1726. Rays of light 1745 scattered from the object 1710 return to the rotary mirror 1726, pass through the beam path 1750 before reaching an optical detector 1760. Receiver electronics and processor system 1770 evaluates the electrical signal from the optical detector 1760 to determine the distance traveled by the light in traveling to the object 1710. In an embodiment, angular transducers such as angular encoders measure the angles of rotation about the vertical axis 1723 and the horizontal axis 1725. In an embodiment, the light beam 1730 is a laser beam that is amplitude modulated or intensity modulated, for example, with a sinusoidal waveform or a rectangular waveform. In an embodiment, the scanner further includes accessory cameras such as a central color camera 1780 or 360-degree camera 1790. Any camera coupled to the TOF scanner 1700, including either camera 1780, 1790, may serve as a photogrammetry camera to color images from different poses.

Figure 19:
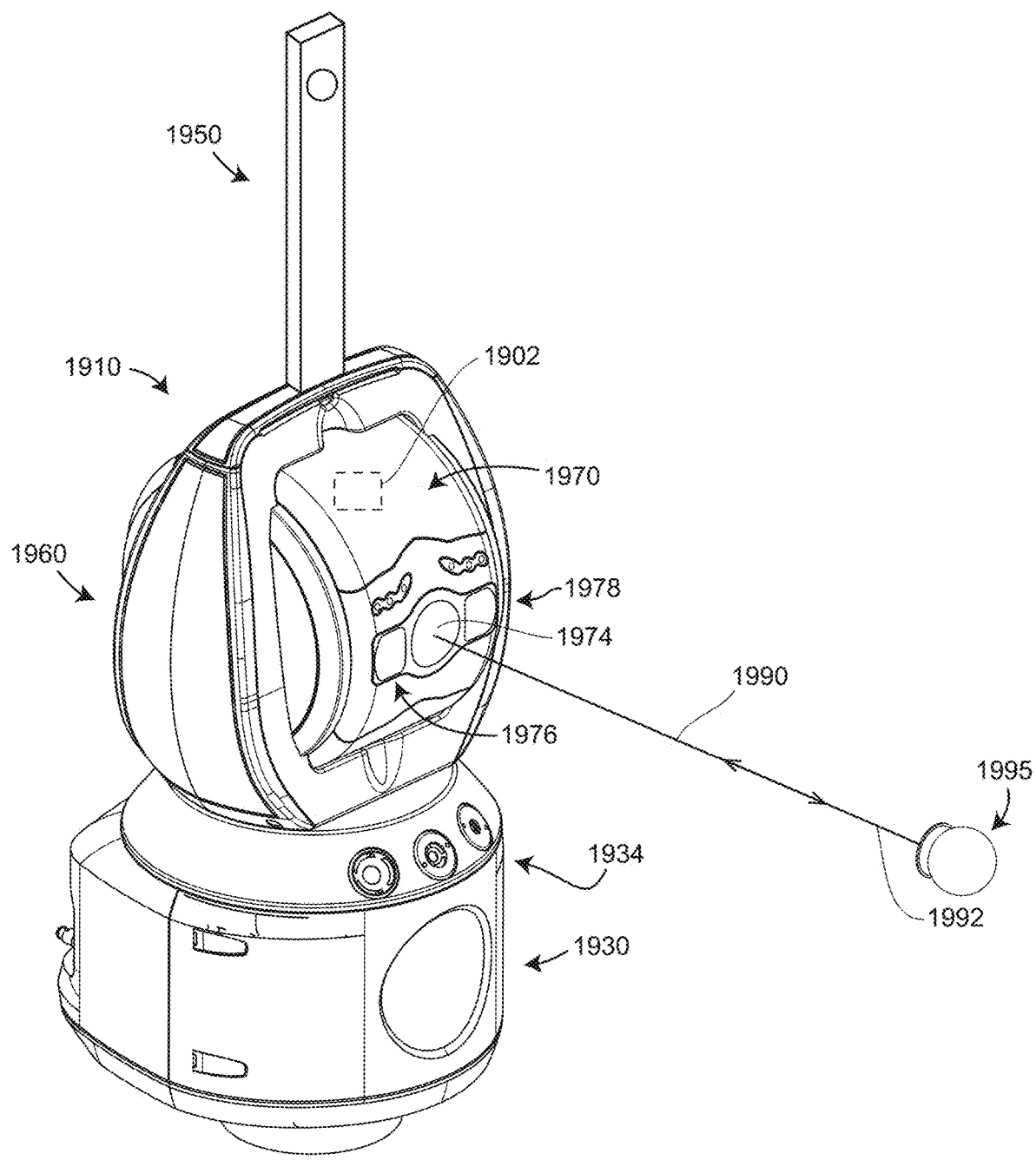
FIG. 19 is an isometric view of a laser tracker according to an embodiment.

The laser tracker 1910 in FIG. 19 sends outgoing light 1990 through an exit aperture 1974 to a spherically mounted retroreflector 1995 or other retroreflector, which returns the light along a parallel path as returning light 1992, passing a second time through the exit aperture 1974. The tracker includes a base assembly 1930, a yoke assembly 1960, and a payload assembly 1970. A distance meter measures distance to the retroreflector 1995 and angular transducers such as angular encoders (not shown) measure the angles of rotation of the payload assembly 1970 about a horizontal axis and of the yoke assembly about a vertical axis. An outer portion of the payload assembly 1970 includes a first locator camera 1976 and a second locator camera 1978. An outer portion of the base assembly 1930 includes magnetic home-position nests 1934 operable to hold SMRs of different diameters. In an embodiment, the laser tracker 1910 in FIG. 19 further includes a 360-degree camera 1950. In an embodiment, one or more of the cameras 1976, 1978, 1950 serve as photogrammetry cameras that may provide high resolution color images as described elsewhere in the current application. A processor 1902 combines data from the sensors of the laser tracker 1910 to obtain composite 3D coordinate data.

Cameras that provide photogrammetry (e.g., texture) information according to the embodiments described herein above may be affixed to a 3D measuring device or separated from the 3D measuring device. In the examples illustrated above in the 3D measuring device 100 and in other 3D measuring devices, for example, the LLP 1420, the area scanner 1610, the TOF scanner 1700, and the laser tracker 1910, each 3D measuring devices is coupled to one or more photogrammetry (e.g., texture) cameras affixed to the 3D measuring instruments. In other embodiments, the photogrammetry camera is detached from the 3D measuring device.

Figure 20:
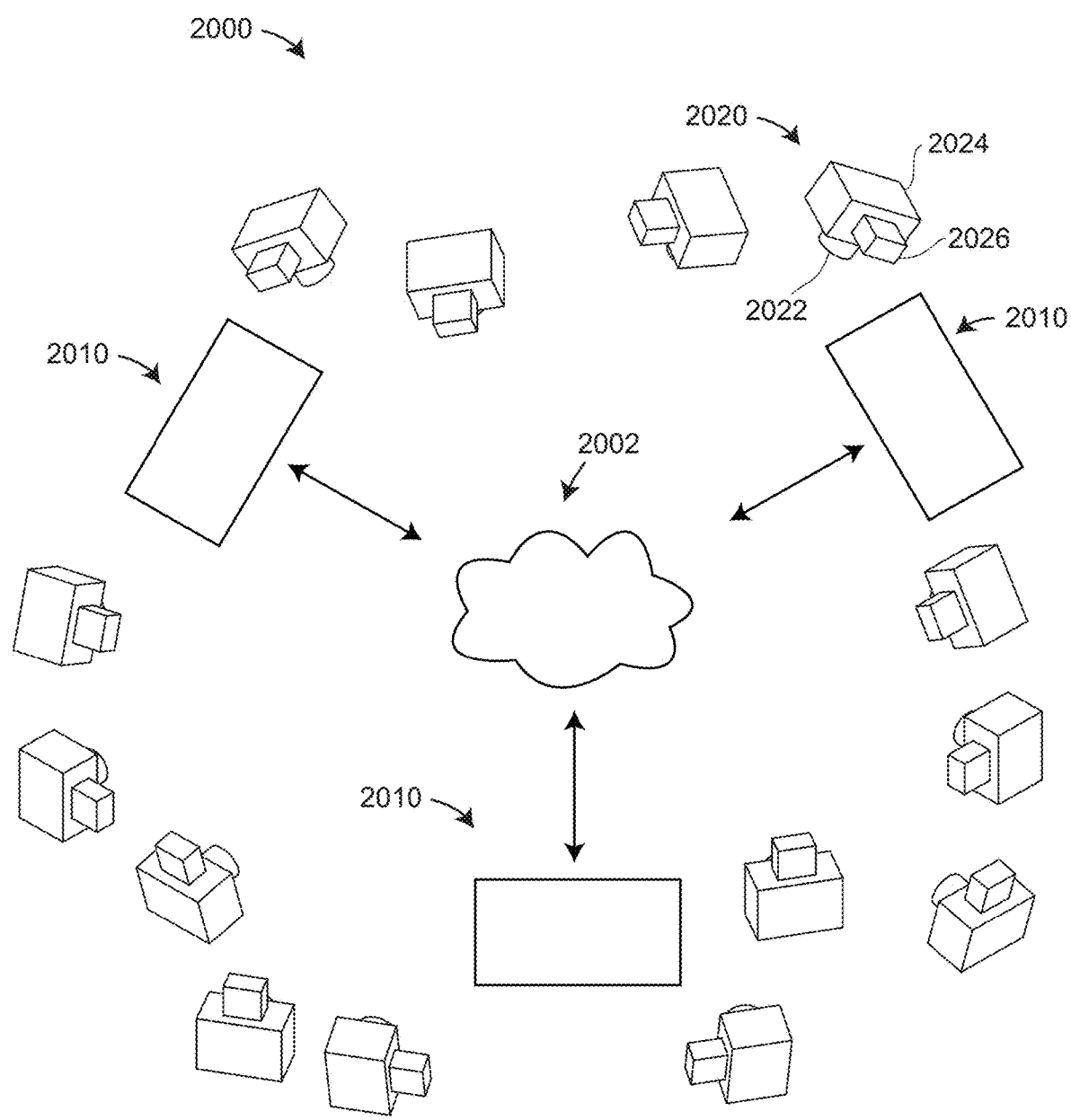
FIG. 20 is a schematic representation of a 3D measuring instrument used in conjunction with a detached photogrammetry camera according to an embodiment.

As illustrated in FIG. 20, the combination of the 3D measuring system 2000 and the photogrammetry camera in the plurality of poses enables dense textured (e.g., color) 3D coordinates to be obtained for an object 2002. Each photogrammetry camera includes at least a lens 2020 and body 2024 enclosing a photosensitive array. An illuminator 2026, such as might be provided by a ring of LEDs or a separate flash attachment is optional. In an embodiment, the photogrammetry cameras capture identified features, which may be natural or artificial features, enabling registration of multiple 3D images, as described herein above in reference to the 3D measuring device 100.

As used herein, the term "processor" may refer to a specific integrated circuit (ASIC), a field programmable gate array (FPGA), an electronic circuit, an electronic computer processor (shared, dedicated, or group) and memory that executes one or more software or firmware programs, a hardware microcontroller, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiments disclosed, but that the invention will include all embodiments falling within the scope of the application.

What is claimed is:

1. A method comprising:
    determining three-dimensional (3D) coordinates of an object surface with a 3D measuring device;
    forming from the determined 3D coordinates a mesh having a first face;
    constructing a voxel array aligned to the first face, the voxel array having a plurality of voxel rows parallel to the first face;

obtaining a plurality of images from a first camera, the first camera having a corresponding plurality of poses;

obtaining for each voxel in the voxel array a plurality of voxel values obtained from the corresponding plurality of images;

determining for each voxel row a quality value, wherein the quality value is determined based on an average value of a first voxel values determined as a function of pose and a variation of the first voxel values determined as the function of pose;

determining a distance from a point on the first face to the object surface based at least in part on the determined quality values for the voxel rows; and storing the determined distance.

2. The method of claim 1, wherein the quality value is further based on a ratio of the average value of the first voxel values determined as the function of pose to the dispersion of the first voxel values determined as the function of pose.

3. The method of claim 1, wherein the variation of the first voxel values determined as the function of pose includes a value selected from a group consisting of a variance and a standard deviation.

4. The method of claim 1, wherein each voxel value in the plurality of voxel values includes at least one of a gray scale and a color.

5. The method of claim 1, wherein the first voxel value determined as a function of pose is based on a value of the given voxel in a given pose minus a weighted average of all voxel values in the given pose in the voxel row.

6. The method of claim 5, wherein the first voxel values are further determined based on multiplication by a first normalization factor.

7. The method of claim 6 wherein the first quantity is further based on second voxel values, the second voxel values determined based on the voxel values summed over all poses in the voxel row and multiplied by a second normalization factor.

8. The method of claim 7, wherein the first voxel values determined as the function of pose is further based on an inner product of the first voxel values and the second voxel values, wherein the inner product is taken over voxels in the voxel row.

9. The method of claim 7, wherein the first voxel values determined as the function of pose includes an autocorrelation of the first voxel values and the second voxel values taken with respect to pose.

10. The method of claim 1, wherein the determined distance from the point on the first face to the object surface is further based on an interpolation among determined first quality values for the voxel rows.

11. The method of claim 1, wherein the first camera is fixedly coupled to the 3D measuring device.

12. The method of claim 1, wherein the first camera is detached from the 3D measuring device.

13. The method of claim 11, wherein the 3D measuring device is a triangulation scanner having a projector.

14. The method of claim 11, wherein the triangulation scanner further includes a second camera and a texture camera.

15. The method of claim 11, wherein the triangulation scanner is either a line scanner or a structured light area scanner.

16. The method of claim 1, wherein the 3D measuring device is a time-of-flight (TOF) scanner that uses modulated light to determine distance.

17. The method of claim 1 wherein the 3D measuring device is an articulated arm coordinate measuring machine or a laser tracker.

18. A system comprising:

a three-dimensional (3D) measuring device operable to determine 3D coordinates of an object surface;

a first camera operable to capture a plurality of images from a corresponding plurality of poses; and a processor system operable to:

form from the determined 3D coordinates a mesh having a first face, construct a voxel array aligned to the first face, the voxel array having a plurality of voxel rows parallel to the first face, obtain for each voxel in the voxel array a plurality of voxel values obtained from the corresponding plurality of images, determine for each voxel row a quality value, wherein the quality value is determined based on an average value of a first voxel values determined as a function of pose and a variation of the first voxel values determined as the function of pose, and determine a distance from a point on the first face to the object surface based at least in part on the determined quality values for the voxel rows.

19. The system of claim 18, wherein the variation includes either a variance or a standard deviation.

20. The system of claim 18, wherein each voxel value in the plurality of voxel values includes at least one of a gray scale and a color.

21. The system of claim 18, wherein the processor system determines the first voxel values for a given voxel and a given pose further based on the voxel value of the given voxel in the given pose minus a weighted average of all voxel values in the given pose in the voxel row.

22. The system of claim 21, wherein the processor system determines the weighted average based on a weight of one for each voxel value in the given pose in the voxel row.

23. The system of claim 21, wherein the processor system determines the first voxel values further based on multiplication by a first normalization factor.

24. The system of claim 23, wherein the processor system determines the first voxel values determined as the function of pose further based on second voxel values, the second voxel values determined based on the voxel values summed over all poses in the voxel row and multiplied by a second normalization factor.

25. The system of claim 23, wherein the processor determines the first voxel values determined as the function of pose further based on second voxel values, the second voxel values determined based on the voxel values summed over all poses in the voxel row and multiplied by a second normalization factor.

26. The system of claim 24, wherein the first voxel values determined as the function of pose includes an autocorrelation of the first voxel values and the second voxel values taken with respect to pose.

27. The system of claim 18, wherein:

the processor determines the distance from the point on the first face to the object surface further based on an interpolation among determined first quality values for the voxel rows.

28. The system of claim 18, wherein the first camera is fixedly coupled to the 3D measuring device.

29. The system of claim 18, wherein the first camera is detached from the 3D measuring device.

30. The system of claim 28, wherein the 3D measuring device is a triangulation scanner having a projector.

31. The system of claim 28, wherein the triangulation scanner further includes a second camera and a texture camera.

32. The system of claim 28, wherein the triangulation scanner is either a line scanner or a structured light area scanner.

33. The system of claim 18, wherein the 3D measuring device is a time-of-flight (TOF) scanner that uses modulated light to determine distance.

34. The system of claim 18, wherein the 3D measuring device is an articulated arm coordinate measuring machine or a laser tracker.

* * * * *